US007822203B2

(12) United States Patent  
Soda

(10) Patent No.: US 7,822,203 B2  
(45) Date of Patent: Oct. 26, 2010

(54) METHOD, APPARATUS, AND PROGRAM FOR PROCESSING INFORMATION

(75) Inventor: Atsumu Soda, Tokyo (JP)

(73) Assignee: Sony Corporation, Tokyo (JP)

( * ) Notice: Subject to any disclaimer, the term of this patent is extended or adjusted under 35 U.S.C. 154(b) by 791 days.

(21) Appl. No.: 11/459,804

(22) Filed: Jul. 25, 2006

(65) Prior Publication Data

US 2007/0113084 A1 May 17, 2007

(30) Foreign Application Priority Data

Aug. 4, 2005 (JP) .............................. 2005-226243

(51) Int. Cl.  
*H04L 9/00* (2006.01)
(52) U.S. Cl. ..................... 380/260; 380/278; 380/42
(58) Field of Classification Search ................ 713/153, 713/160, 168; 380/44, 47, 200, 260–262, 380/267  
See application file for complete search history.

(56) References Cited

U.S. PATENT DOCUMENTS

| 2001/0044899 | A1 | 11/2001 | Levy |
| 2002/0048389 | A1* | 4/2002 | Komaki .................... 382/107 |
| 2003/0200176 | A1* | 10/2003 | Foster et al. ................. 705/51 |
| 2005/0166050 | A1* | 7/2005 | Kosaki ....................... 713/171 |
| 2006/0050883 | A1* | 3/2006 | Walker et al. ............... 380/239 |
| 2006/0053441 | A1* | 3/2006 | Walker ........................ 725/30 |

FOREIGN PATENT DOCUMENTS

| JP | 63-133721 | 6/1988 |
| JP | 5-298606 | 11/1993 |
| JP | 8-77704 | 3/1996 |
| JP | 11-340966 | 12/1999 |
| JP | 2000-287192 | 10/2000 |
| JP | 2000-293936 | 10/2000 |

(Continued)

OTHER PUBLICATIONS

SMPTE Standard for D-Cinema, Link Encryption for 1.5Gb/s Serial Digital Interface, SMPTE Technology Committee DC 28.30 Digital Cinema Exhibition, FCD-Rev 2, Mar. 15, 2005.*

(Continued)

*Primary Examiner*—Gilberto Barron, Jr.  
*Assistant Examiner*—Shaun Gregory  
(74) *Attorney, Agent, or Firm*—Oblon, Spivak, McClelland, Maier & Neustadt, L.L.P.

(57) ABSTRACT

An information processing apparatus decrypts, using meta data, encrypted data obtained by encrypting stream data including successive frames according to an encryption method in which, when the stream data is sequentially encrypted on a frame-by-frame basis, a key used for encrypting each frame is updated according to a predetermined rule. The meta data includes the plurality of keys used for encrypting the stream data and update information for identifying update timings of the keys. The apparatus includes a decrypter for acquiring the encrypted data and decrypting each frame using the key used for encrypting the frame and a meta data acquirer for acquiring the meta data and delivering one of the keys corresponding to the frame to the decrypter in accordance with the update information. The meta data acquirer includes a corrector for detecting an error in the update information and correcting the update information if an error has occurred.

11 Claims, 24 Drawing Sheets

FOREIGN PATENT DOCUMENTS

| | | |
|---|---|---|
| JP | 2001-86481 | 3/2001 |
| JP | 2002-176419 | 6/2002 |
| JP | 2002-203070 | 7/2002 |
| JP | 2002-217894 | 8/2002 |
| JP | 2002-251328 | 9/2002 |
| JP | 2003-143548 | 5/2003 |
| JP | 2003-528538 | 9/2003 |
| JP | 2004-96754 | 3/2004 |
| JP | 2004-133801 | 4/2004 |
| JP | 2005-217843 | 8/2005 |
| WO | WO 00/52690 | 9/2000 |
| WO | WO 2005/043806 A1 | 5/2005 |

OTHER PUBLICATIONS

U.S. Appl. No. 11/495,568, filed Jul. 31, 2006, Soda.

* cited by examiner

FIG. 7

| PATTERN NAME | NORMAL TRANSITION PATTERN OF KEY CHANGE TIMING | |
|---|---|---|
| | VALUE OF KEY CHANGE TIMING 124 FOR IMMEDIATELY PRIOR FRAME | VALUE OF KEY CHANGE TIMING 124 FOR TARGET FRAME |
| PATTERN 1 | 2'b11 | 2'b11 or 2'b10 |
| PATTERN 2 | 2'b10 | 2'b01 |
| PATTERN 3 | 2'b01 | 2'b00 |
| PATTERN 4 | 2'b00 | 2'b11 |

FIG. 20

| Key Change Timing 124 | 3 | 3 | 3 | 3 | 1 | 0 | 3 | 3 | 3 | 3 | 3 |
|---|---|---|---|---|---|---|---|---|---|---|---|
| Current Frame Count 134 | N−5 | N−4 | N−3 | N−2 | N−1 | N | 0 | 1 | 2 | 3 | 4 | 5 | 6 | 7 | 8 |

↔ 1 frame

TIME →

METHOD, APPARATUS, AND PROGRAM FOR PROCESSING INFORMATION

CROSS REFERENCES TO RELATED APPLICATIONS

The present invention contains subject matter related to Japanese Patent Application JP 2005-226243 filed in the Japanese Patent Office on Aug. 4, 2005, the entire contents of which are incorporated herein by reference.

BACKGROUND OF THE INVENTION

1. Field of the Invention

The present invention relates to a method, an apparatus, and a program for processing information and, in particular, to a method, an apparatus, and a program that allow a decrypting apparatus to properly carry out a decrypting process using meta data even when an error has occurred during transmission of the meta data from an encrypting apparatus to the decrypting apparatus.

2. Description of the Related Art

In recent years, an encryption method has been proposed in which stream data including a plurality of successive units of data is sequentially encrypted on a unit-by-unit basis and a key used for encrypting each of the units of data is changed according to a predetermined rule (refer to, for example, Japanese Unexamined Patent Application Publication No. 2003-143548).

In addition, the development of an encrypting apparatus that encrypts stream data according to such an encryption method and generates meta data including a plurality of keys used for encrypting the stream data and update information for identifying the timings of updating the keys has started.

Furthermore, the development of a decrypting apparatus that decrypts data encrypted using such an encrypting apparatus by using the meta data generated by the encrypting apparatus has started.

SUMMARY OF THE INVENTION

However, if an error occurs when the encrypting apparatus transmits the meta data to the decrypting apparatus, the decrypting apparatus cannot normally carry out the decrypting process using the meta data.

Accordingly, the present invention provides a decrypting apparatus that can normally carry out the decrypting process using meta data even when an error occurs during the transmission of the meta data from the encrypting apparatus to the decrypting apparatus.

According to an embodiment of the present invention, an information processing apparatus decrypts, using meta data, encrypted data obtained by encrypting stream data including a plurality of successive units of data according to a first encryption method in which, when the stream data is sequentially encrypted on a unit-by-unit basis, each of a plurality of keys used for encrypting a corresponding one of the units of data is updated on the basis of a predetermined rule. The meta data includes the plurality of keys used for encrypting the stream data and update information for identifying update timings of the plurality of keys. The information processing apparatus includes a decrypter configured to acquire the encrypted data and decrypt each of the units of data in the encrypted data using the key used for encrypting the unit of data among the plurality of keys and a meta data acquirer configured to acquire the meta data and deliver one of the plurality of keys contained in the meta data that corresponds to the unit of data to the decrypter in accordance with the update information contained in the meta data. The meta data acquirer includes a first corrector configured to determine whether an error has occurred in the update information and correct at least part of the update information when determining that an error has occurred.

The update information can include units of update information, each corresponding to one of the plurality of units of data in the stream data. The first corrector can determine whether an error has occurred in the unit of update information corresponding to the unit of data that is a target of a decrypting process performed by the decrypter. If the first corrector determines that the error has occurred, the first corrector can correct the unit of update information.

Each of the units of update information can include an update value indicating to which unit of data prior to the unit of data the update timing of the next key for the unit of data corresponds and the first corrector can determine whether an error has occurred in a first update value relating to the target unit of data among the update values on the basis of a transition pattern from a second update value relating to the unit of data immediately prior to the target unit of data to the first update value.

The meta data can include Meta packets 1, 2, and 3 that are generated for each of the plurality of units of data and that comply with Society of Motion Picture and Television Engineers (SMPTE) 291M, the plurality of keys can be encrypted using a second encryption method that is different from the first encryption method and a predetermined one of a plurality of the encrypted keys is included in the Meta packets 1 and 2 associated with a predetermined unit of data, and each of the update values can be contained in Key Changing Timing of the Meta packet 3 for the corresponding unit of data.

The first update value representing a value of Key Changing Timing of the Meta packet 3 for the target unit of data can be one of a 0th value that indicates that the target unit of data is the update timing of the next key, a 1st value that indicates that a unit of data subsequent to the target unit of data is the update timing of the next key, and a 2nd value that indicates that a unit of data that is two units subsequent to the target unit of data is the update timing of the next key, and a 3rd value that indicates that a unit of data that is three units or more units subsequent to the target unit of data is the update timing of the next key. Among transition patterns from the second update value to the first update value, a first transition pattern from the 3rd value to one of the 3rd value and the 2nd value, a second transition pattern from the 2nd value to the 1st value, a third transition pattern from the 1st value to the 0th value, and a fourth transition pattern from the 0th value to the 3rd value can be defined to be normal transition patterns, and transition patterns other than the first, second, third, and fourth transition patterns can be defined to be abnormal transition patterns. The first corrector can determine whether the transition pattern from the second update value to the first update value is the normal transition pattern or the abnormal transition pattern. If the first corrector determines that the transition pattern from the second update value to the first update value is the abnormal transition pattern, the first corrector can determine that an error has occurred in the first update value so as to correct the first update value.

If the first corrector determines that the transition pattern from the second update value to the first update value is the abnormal transition pattern, the first corrector can correct the first update value so that the transition pattern from the second update value to the first update value is changed to one of the normal transition patterns.

The first corrector can further determine whether a transition pattern from a third update value for the unit of data that is two units prior to the target unit of data to the second update value is the normal transition pattern or the abnormal transition pattern. If the first corrector determines that the transition pattern from the third update value to the second update value is the abnormal transition pattern and the transition pattern from the second update value to the first update value is the abnormal transition pattern, the first corrector can disable correction of the first update value.

The information processing apparatus can further include a second corrector configured to determine whether a transition pattern from a first count value in Current Frame Count of the Meta packet 3 for the unit of data that is immediately prior to the target unit of data to a second count value in the Current Frame Count of the Meta packet 3 for the target unit of data is abnormal. The second corrector corrects the second count value if the second corrector determines that the transition pattern is abnormal.

If the second corrector determines that the transition pattern from the first count value to the second count value is abnormal and the first update value for the target unit of data is the 0th value, the second corrector can correct the second count value on the basis of the first update value that is the 0th value. If the second corrector determines that the transition pattern from the first count value to the second count value is abnormal and the first update value for the target unit of data is a value other than the 0th value, the second corrector can correct the second count value on the basis of the first count value.

According to another embodiment of the present invention, an information processing method is provided for use in an information processing apparatus configured to decrypt, using meta data, encrypted data obtained by encrypting stream data including a plurality of successive units of data according to a encryption method in which, when the stream data is sequentially encrypted on a unit-by-unit basis, each of a plurality of keys used for encrypting a corresponding one of the units of data is updated on the basis of a predetermined rule. The meta data includes the plurality of keys used for encrypting the stream data and update information for identifying update timings of the plurality of keys, and the information processing apparatus includes at least a decrypter configured to acquire the encrypted data and decrypt each of the units of data in the encrypted data using the key used for encrypting the unit of data. The information processing method includes the steps of acquiring the meta data, determining whether an error has occurred in the update information contained in the meta data, correcting at least part of the update information when determining that an error has occurred, and delivering one of the plurality of keys contained in the meta data that corresponds to the unit of data to the decrypter in accordance with the update information contained in the meta data when determining that an error has not occurred or in accordance with the corrected update information when determining that an error has occurred.

According to still another embodiment of the present invention, a program is provided for causing a computer to decrypt, using meta data, encrypted data obtained by encrypting stream data including a plurality of successive units of data according to a encryption method in which, when the stream data is sequentially encrypted on a unit-by-unit basis, each of a plurality of keys used for encrypting a corresponding of the units of data is updated on the basis of a predetermined rule. The meta data includes the plurality of keys used for encrypting the stream data and update information for identifying update timings of the plurality of keys. The program causes the computer to acquire the encrypted data and decrypt each of the units of data in the encrypted data using the key used for encrypting the unit of data. The program includes the steps of acquiring the meta data, determining whether an error has occurred in the update information contained in the meta data, correcting at least part of the update information when determining that an error has occurred, and delivering one of the plurality of keys contained in the meta data that corresponds to the unit of data to the decrypter in accordance with the update information contained in the meta data when determining that an error has not occurred or in accordance with the corrected update information when determining that an error has occurred.

According to yet another embodiment of the present invention, a decrypting process is executed so as to decrypt, using meta data, encrypted data obtained by encrypting stream data including a plurality of successive units of data according to a encryption method in which, when the stream data is sequentially encrypted on a unit-by-unit basis, each of a plurality of keys used for encrypting a corresponding one of the units of data is updated on the basis of a predetermined rule. The meta data includes the plurality of keys used for encrypting the stream data and update information for identifying update timings of the plurality of keys. The process acquires the encrypted data and decrypt each of the units of data in the encrypted data using the key used for encrypting the unit of data. When the decrypting process is executed, the meta data is acquired and it is determined whether an error has occurred in the update information contained in the meta data. If it is determined that an error has occurred, at least part of the update information is corrected. One of the plurality of keys contained in the meta data that corresponds to the unit of data is delivered as the key for the decrypting process in accordance with the update information contained in the meta data when determining that an error has not occurred or in accordance with the corrected update information when determining that an error has occurred.

As described above, according to the embodiments of the present invention, a decrypting process using meta data can be realized. In particular, even when an error occurs during transmission of the meta data from the encrypting apparatus to the decrypting apparatus, the decrypting apparatus can normally carry out the decrypting process using the meta data.

BRIEF DESCRIPTION OF THE DRAWINGS

FIG. 7 illustrates normal transition patterns from the value of Key Chang Timing contained in meta data shown in FIG. 4 for the immediately prior frame to that for the target frame;

FIG. 20 is a diagram illustrating a relationship between the value of Key Change Timing and Current Frame Count contained in the meta data;

DESCRIPTION OF THE PREFERRED EMBODIMENTS

Before describing an embodiment of the present invention, the correspondence between the features of the claims and the specific elements disclosed in an embodiment of the present invention is discussed below. This description is intended to assure that embodiments supporting the claimed invention are described in this specification. Thus, even if an element in the following embodiments is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

Furthermore, this description should not be construed as restricting that all the aspects of the invention disclosed in the embodiments are described in the claims. That is, the description does not deny the existence of aspects of the present invention that are described in the embodiments but not claimed in the invention of this application, i.e., the existence of aspects of the present invention that in future may be claimed by a divisional application, or that may be additionally claimed through amendments.

Figure 1:
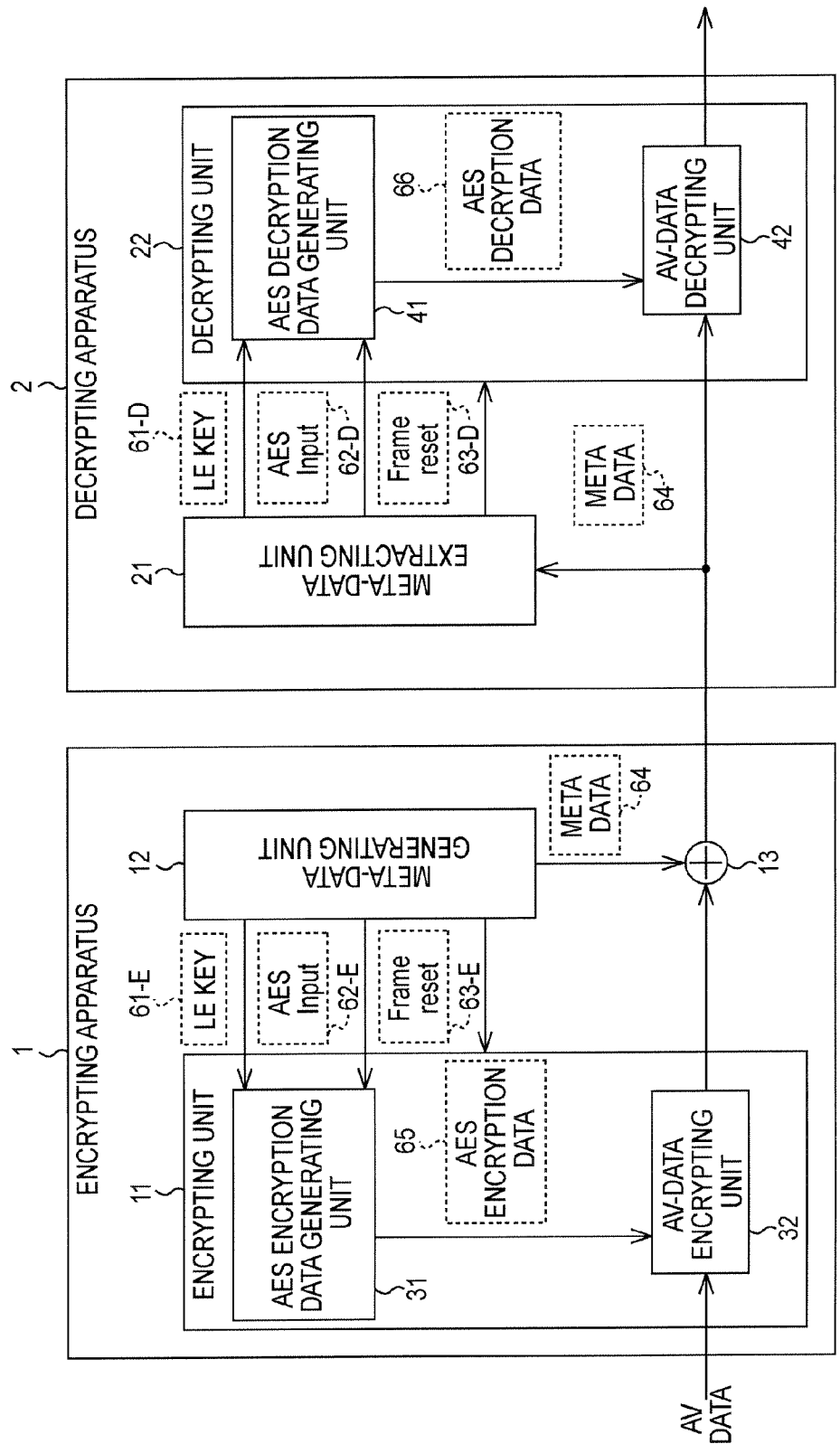
FIG. 1 illustrates an exemplary configuration of an encrypting/decrypting system according to an embodiment of the present invention.

According to an embodiment of the present invention, an information processing apparatus (e.g., a decrypting apparatus 2 shown in FIG. 1) decrypts, using meta data (e.g., meta data 64 in FIG. 1 including meta data 64-3 in FIG. 4), encrypted data (e.g., encrypted AV data output from an AV-data encrypting unit 32 of an encrypting unit 11 shown in FIG. 1) obtained by encrypting stream data including a plurality of successive units of data (e.g., AV data in FIG. 1) according to a first encryption method (e.g., an encryption method using AES shown in FIG. 6) in which, when the stream data is sequentially encrypted on a unit-by-unit basis, each of a plurality of keys used for encrypting a corresponding one of the units of data (e.g., an LE key 61-E in FIG. 1 encrypted with RSA in the following example) is updated on the basis of a predetermined rule. As used herein, the term "unit of data" is referred to as a frame (data), which will be described below. The meta data includes the plurality of keys used for encrypting the stream data and update information (e.g., Key Change Timing in FIG. 4) for identifying update timings of the plurality of keys. The information processing apparatus includes a decrypter (e.g., a decrypting unit 22) configured to acquire the encrypted data and decrypt each of the units of data in the encrypted data using the key used for encrypting the unit of data (e.g., an LE key 61-D in FIG. 1) among the plurality of keys and a meta data acquirer (e.g., a meta data extracting unit 21 in FIG. 1 having a configuration shown in FIG. 5) configured to acquire the meta data and deliver one of the plurality of keys contained in the meta data that corresponds to the unit of data to the decrypter in accordance with the update information contained in the meta data. The meta data acquirer includes a first corrector (e.g., the key change timing correction unit 111 in FIG. 5) configured to determine whether an error has occurred in the update information and correct at least part of the update information when determining that an error has occurred.

In the information processing apparatus according to the embodiment of the present invention, the meta data includes Meta packets 1, 2, and 3 that are generated for each of the plurality of units of data and that comply with Society of Motion Picture and Television Engineers (SMPTE) 291M (e.g., meta data 64-1 representing Meta packet 1 shown in FIG. 2, meta data 64-2 representing Meta packet 2 shown in FIG. 3, and meta data 64-3 representing Meta packet 3 shown in FIG. 4), the plurality of keys is encrypted using a second encryption method that is different from the first encryption method (e.g., an encryption method using RSA described below) and a predetermined one of a plurality of the encrypted keys is included in the Meta packets 1 and 2 associated with a predetermined unit of data (e.g., included as Elekp data shown in FIGS. 2 and 3), and each of the update values is contained in Key Changing Timing of the Meta packet 3 for the corresponding unit of data.

In the information processing apparatus according to the embodiment of the present invention, the first update value representing a value of Key Changing Timing of the Meta packet 3 for the target unit of data is one of a 0th value that indicates that the target unit of data is the update timing of the next key (e.g., 0=2'b00), a 1st value that indicates that a unit of data subsequent to the target unit of data is the update timing of the next key (e.g., 1=2'b01), and a 2nd value that indicates that a unit of data that is two units subsequent to the target unit of data is the update timing of the next key (e.g., 2=2'b10), and a 3rd value that indicates that a unit of data that is three units or more units subsequent to the target unit of data is the update timing of the next key (e.g., 3=2'b11). Among transition patterns from the second update value to the first update value, a first transition pattern from the 3rd value to one of the 3rd value and the 2nd value (e.g., a pattern 1 shown in FIG. 7), a second transition pattern from the 2nd value to the 1st value (e.g., a pattern 2 shown in FIG. 7), a third transition pattern from the 1st value to the 0th value (e.g., a pattern 3 shown in FIG. 7), and a fourth transition pattern from the 0th value to the 3rd value (e.g., a pattern 4 shown in FIG. 7) are defined to be normal transition patterns, and transition patterns other than the first, second, third, and fourth transition patterns are defined to be abnormal transition patterns. The first corrector can determine whether the transition pattern from the second update value to the first update value is the normal transition pattern or the abnormal transition pattern. If the first corrector determines that the transition pattern from the second update value to the first update value is the abnormal transition pattern, the first corrector can determine that an error has occurred in the first update value so as to correct the first update value.

The information processing apparatus according to the embodiment of the present invention further includes a second corrector (e.g., an LEFRAME count value correcting unit 112 shown in FIG. 5) configured to determine whether a transition pattern from a first count value in Current Frame Count of the Meta packet 3 for the unit of data that is immediately prior to the target unit of data to a second count value in the Current Frame Count of the Meta packet 3 for the target unit of data is abnormal. The second corrector corrects the second count value if the second corrector determines that the transition pattern is abnormal.

According to an embodiment of the present invention, an information processing method and an information processing program corresponding a process performed by the above-described meta data acquirer (e.g., the meta data extracting unit 21 in FIG. 1 having the configuration shown in FIG. 5) are provided. The information processing method and the program include the steps of acquiring the meta data (e.g., a process performed by a meta data extracting and separating unit 101 shown in FIG. 5), determining whether an error has occurred in the update information contained in the meta data, correcting at least part of the update information (e.g., a process performed by a key change timing correction unit 111, and more specifically, a process according to a flow chart shown in FIGS. 8 and 9) when determining that an error has occurred, and delivering one of the plurality of keys contained in the meta data that corresponds to the unit of data to the decrypter in accordance with the update information contained in the meta data when determining that an error has not occurred or in accordance with the corrected update information when determining that an error has occurred (e.g., a series of processes performed by an LEKP restoring unit 102, a key change trigger generating unit 104, and a register 105).

Exemplary embodiments of the present invention are described with reference to the accompanying drawings.

FIG. 1 illustrates an exemplary configuration of a system including an encrypting apparatus and a decrypting apparatus (hereinafter referred to as an "encrypting/decrypting system"), which is an information processing apparatus according to an embodiment of the present invention.

In FIG. 1, a block surrounded by a solid line indicates a component of the information processing apparatus, whereas a block surrounded by a dotted line indicates predetermined information. These usages of the solid line and the dotted line apply to all the subsequent drawings.

As shown in FIG. 1, the encrypting/decrypting system includes an encrypting apparatus 1 and a decrypting apparatus 2. The encrypting apparatus 1 encrypts, for example, stream data corresponding to content (such as a movie). The stream data is composed of one or more frames. Hereinafter, the stream data is referred to as "AV data". The decrypting apparatus 2 decrypts the AV data encrypted by the encrypting apparatus 1.

In FIG. 1, the encrypting apparatus 1 encrypts the AV data using the advanced encryption standard (AES) encryption, which is one of the encryption standards of common key cryptosystems. To encrypt the AV data, the encrypting apparatus 1 includes an encrypting unit 11, a meta-data generating unit 12, and an overlapping unit 13. The encrypting unit 11 includes an AES encryption data generating unit 31 and an AV-data encrypting unit 32.

Using a common key 61-E and an AES input 62-E, the AES encryption data generating unit 31 generates data (hereinafter referred to as "AES encryption data") 65 for directly encrypting the AV data. The common key is known as an "AES Key". However, as used herein, the common key is referred to as an "LE Key". The AES encryption data generating unit 31 delivers the AES encryption data 65 to the AV-data encrypting unit 32. The AES input 62-E will be described below.

The AV-data encrypting unit 32 encrypts the AV data using the AES encryption data 65 delivered from the AES encryption data generating unit 31 and delivers the encrypted AV data to the overlapping unit 13. At that time, the AV-data encrypting unit 32 encrypts the AV data using a Frame reset 63-E delivered from the meta-data generating unit 12 on a frame-by-frame basis.

More specifically, in this embodiment, the AV data is, for example, HD-SDI data. The AV data includes one or more frame data items. Each of the frame data item includes data Y indicating the luminance of each of pixels in a frame and data Cb/Cr indicating the color of each of the pixels in the frame. Additionally, for example, each of the LE Key 61-E and the AES input 62-E is 128 bits.

In this case, for example, the AES encryption data generating unit 31 generates the 128-bit AES encryption data 65 from 256-bit input data including the 128-bit LE Key 61-E and the 128-bit AES input 62-E. Thereafter, the AES encryption data generating unit 31 delivers the 128-bit AES encryption data 65 to the AV-data encrypting unit 32. More specifically, for example, the AES encryption data generating unit 31 retrieves every 10 bits from the low order 120 bits of the 128-bit AES encryption data 65 and delivers the retrieved bits to the AV-data encrypting unit 32.

The AV-data encrypting unit 32 separately encrypts every 10 bits of data Y and data Cb/Cr in real time as they arrive so as to deliver the encrypted data Y and data Cb/Cr to the overlapping unit 13.

However, hereinafter, the data Y and the data Cb/Cr are collectively referred to as "AV data", except when it is necessary to distinguish the two.

The meta-data generating unit 12 generates a variety of data required for the encrypting operation of the encrypting unit 11. That is, the meta-data generating unit 12 generates a variety of information required for the decrypting operation of the decrypting apparatus 2. For example, as noted above, the meta-data generating unit 12 generates the LE Key 61-E, the AES input 62-E, and the Frame reset 63-E. Additionally, the meta-data generating unit 12 adds some of the other above-described information items to the LE Key 61-E. Thereafter, the meta-data generating unit 12 encrypts the resultant information item (hereinafter referred to as a "link encryption key payload (LEKP)") using, for example, the RSA (R. Rivest, A. Sharmir, and L. Adelman) 2048-bit encryption (hereinafter simply referred to as an "RSA encryption"), which uses the public key of the decrypting apparatus 2. Hereinafter, the data obtained by encrypting the LEKP using the RSA encryption is referred to as an "ELEKP". That is, the meta-data generating unit 12 generates the ELEKP. Subsequently, in addition to the ELEKP, the meta-data generating unit 12 generates meta data 64 including one of the elements of the AES input 62-E (Le_attribute_data, described below) and delivers the meta data 64 to the overlapping unit 13. The meta data 64 will be described in detail below with reference to FIGS. 2 to 4.

The overlapping unit 13 overlaps or inserts the meta data 64 generated by the meta-data generating unit 12 onto or into the V-Blanking period of the data (hereinafter referred to as "encrypted AV data") obtained by encrypting the HD-SDI AV data by means of the AV-data encrypting unit 32. The AV-data encrypting unit 32 then delivers (transfers) the resultant data (hereinafter referred to as "meta-data overlapped and encrypted AV data") to the decrypting apparatus 2. That is, the meta data 64 is inserted on a frame-by-frame basis.

According to the present embodiment, only one LE Key 61-E is not necessarily used for one AV data item (the entire stream data). The LE Key 61-E is updated as needed. That is, a plurality of the LE Keys 61-E are used for one AV data item. The reason is as follows.

If a malicious third party steals content encrypted with the AES (e.g., the encrypted AV data output from the AV-data encrypting unit 32) and the content is encrypted with one type of the AES key (i.e., LE Key 61-E), the AES key may be directly decrypted. To solve this problem, the meta-data generating unit 12 according to the present embodiment periodically changes (appropriately updates) the key used for the AES encryption (LE Key 61-E). Thus, it is difficult for the malicious third party to directly decrypt the content.

However, according to the present embodiment, as noted above, the meta-data generating unit 12 does not directly transmit the LE Key 61-E to the decrypting apparatus 2. Instead, the meta-data generating unit 12 generates an LEKP including the LE Key 61-E and the additional data and encrypts that LEKP using the RSA encryption to obtain the meta data 64 including the resultant ELEKP. Thereafter, the overlapping unit 13 delivers (transmits) the meta data 64 to the decrypting apparatus 2 together with the encrypted AV data (i.e., the meta-data overlapped and encrypted AV data). That is, according to the present embodiment, the encrypting apparatus 1 encrypts each of a plurality of the LE Keys 61-E using the RSA encryption and separately transmits the RSA-encrypted LE Keys 61-E in the order of generation to the decrypting apparatus 2. Therefore, the decrypting apparatus 2 needs to decrypt each of the RSA-encrypted LE Keys 61-E, as will be described below.

Accordingly, the cycle of updating the LE Key 61-E by the meta-data generating unit 12 depends on the processing times of the RSA encrypting operation and the RSA decrypting operation. That is, it follows that the minimal cycle of updating the LE Key 61-E is determined by the processing times of the RSA encrypting operation and the RSA decrypting operation. For example, in the present embodiment, the minimal cycle is determined to be 1 minute.

As noted above, according to this embodiment, only one LE Key 61-E is not used for one AV data item. Instead, a plurality of LE Keys 61-E are used. That is, the LE Key 61-E is updated as needed. In other words, only one LE Key 61-E is not used for all of the frames in one AV data item. Instead, the LE Key 61-E is updated so that different LE Keys 61-E are used for every few frames.

Accordingly, in the present embodiment, every time the meta-data generating unit 12 generates one of the LE Keys 61-E, the meta-data generating unit 12 also generates an identifier (hereinafter referred to as a "Key ID") for identifying the LE Key 61-E. The meta-data generating unit 12 attaches the Key ID to the LE Key 61-E. Thus, the Key ID is included in the meta data 64, as described below.

The LE Key 61-E used for encrypting the AV data needs to be generated before the AV-data encrypting unit 32 starts encrypting the AV data. That is, there is time lag between generating the encrypted AV data and generating the LE Key 61-E used for encrypting the AV data. As a result, the LE Key 61-E contained in the meta data 64 to be overlapped on a predetermined frame (data) (more precisely, contained in an LEKP before the RSA encryption is carried out) is not the one used for encrypting the predetermined frame (data), but the one used for encrypting the frame (data) prior to the predetermined frame (data).

Before an exemplary configuration of the decrypting apparatus 2 is described, the meta data generated by the meta-data generating unit 12 is described in detail with reference to FIGS. 2 to 4.

Figure 2:
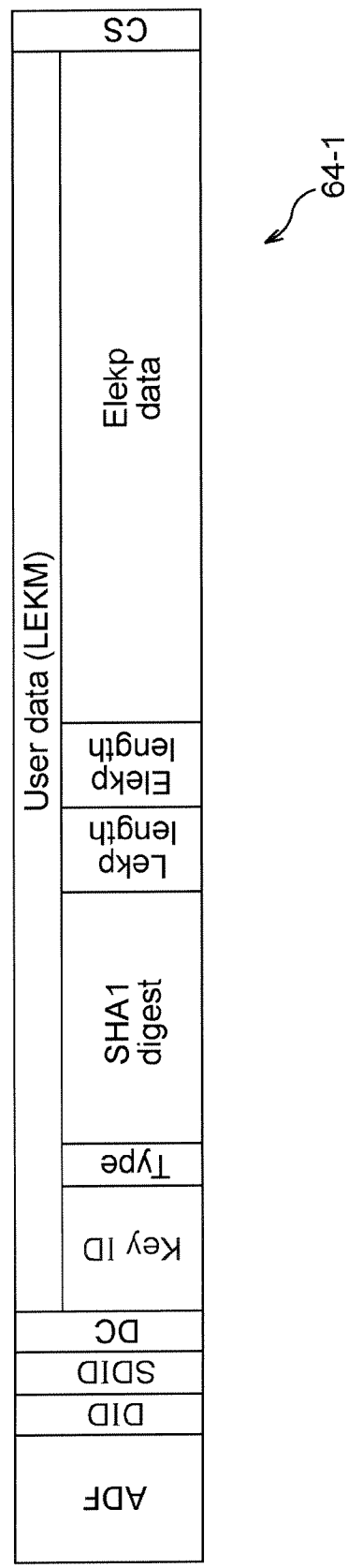
FIG. 2 illustrates an example of the structure of meta data including data used for the encrypting process performed by an encrypting apparatus shown in FIG. 1 and used for the decrypting process performed by a decrypting apparatus.
Figure 3:
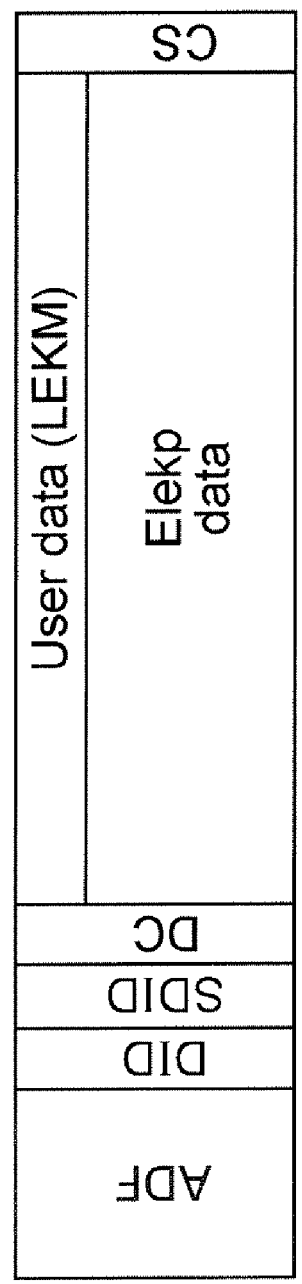
FIG. 3 illustrates an example of the structure of meta data including data used for the encrypting process performed by the encrypting apparatus shown in FIG. 1 and used for the decrypting process performed by the decrypting apparatus.

FIGS. 2 and 3 illustrate the structures of meta data 64-1 and 64-2 including the above-described ELEKP (e.g., the LE Key 61-E encrypted using the RSA), respectively. FIG. 4 illustrates an exemplary structure of meta data 64-3 including the AES input 62-E.

According to the present embodiment, the packet structures of the meta data 64-1, 64-2, and 64-3 comply with the SMPTE 291M standard (society of motion picture and television engineer: proposal SMPTE standard for television-ancillary data packet and space formatting). In general, the packets of the meta data 64-1, 64-2, and 64-3 are referred to as a "Meta packet 1", "Meta packet 2", and "Meta packet 3", respectively. That is, according to the SMPTE 291M standard, for example, as shown in FIGS. 2 to 4, the packet structure include an ancillary data flag field (ADF: "000, 3FF, or 3FF" for "component" and "3FC" for "composite"), a data ID field (DID), a secondary data ID field (SDID), a data count field (DC), a User data field, and a check sum field (CS) in this order. Each of the meta data 64-1, 64-2, and 64-3 has such a packet structure. In this embodiment, the user data field contains, for example, the following information.

The user data field of the meta data 64-1 contains data "Key ID", "Type", "SHA1 digest", "Lekp length", "Elekp length", and "Elekp data". The user data field of the meta data 64-2 contains data "Elekp data".

The following descriptions are made in random order. The Elekp data is data obtained by encrypting the LEKP including the LE Key 61-E with RSA, as described above. That is, the Elekp data is the ELEKP. The Key ID is the identifier of the LE Key 61-E encrypted and included in the ELEKP, as described above. The Elekp length represents the data length of the ELEKP. The Lekp length represents the data length of the LEKP.

The "Type" represents the encryption method used for encrypting the LEKP (the type of encryption algorithm). In this embodiment, a value "0" which represents the RSA encryption is assigned as the Type. The "SHA1 digest" represents the identifier of a public key used when the ELEKP is generated (i.e., when the LEKP is encrypted with the RSA).

Hereinafter, the "User data" of the meta data 64-1 and 64-2, which contain the above-described various data, is referred to as a "Link Encryption Key Message (LEKM)".

In contrast to the LEKM (the User data of the meta data 64-1 and 64-2), the User data of the meta data 64-3 includes data "Next Key ID", "Current Key ID", "Current Frame Count", "key Changing Timing", and "HD-SDI Link Number".

As used herein, the frame into which the target meta data 64-3 is inserted is referred to as a "target frame". Additionally, the time immediately before the target frame (data corresponding to the target frame in the AV data) is about to be encrypted is referred to as a "current time". The LE Key 61-E at the current time is referred to as a "Current LE Key 61-E". An LE Key 61-E that is generated immediately after the Current LE Key 61-E is generated (i.e., an LE Key 61-E that is generated by the meta-data generating unit 12 at the next update timing) is referred to as a "Next LE Key 61-E". In contrast, an LE Key 61-E that is generated immediately before the Current LE Key 61-E is generated (i.e., an LE Key 61-E that is generated by the meta-data generating unit 12 at the immediately prior update timing) is referred to as a "Previous LE Key 61-E".

In this case, the meta data 64-3, which is inserted into the target frame, includes data "Next Key ID", "Current Key ID", "Current Frame Count", "Key Changing Timing", and "HD-SDI Link Number" containing the following information.

The Next Key ID contains the Key ID of the Next LE Key 61-E, and the "Current Key ID" contains the Key ID of the Current LE Key 61-E.

The Current Frame Count contains the ordinal number of the target frame from the current frame when the Previous LE Key 61-E is changed to the Current LE Key 61-E (hereinafter, such a point of time is referred to as a "Key Change Timing"). It is noted that the ordinal number of the current frame is "0".

The Key Changing Timing contains one of the values of 2'b11, 2'b10, 2'b01, and 2'b00. These values indicate which frame is the frame at the next Key Changing Timing. More specifically, the value 2'b11(=3) indicates that the Key Changing Timing occurs after three frames subsequent to the target frame. The value 2'b10(=2) indicates that the Key Changing Timing occurs at a frame that is two frames subsequent to the target frame. The value 2'b01(=1) indicates that the Key Changing Timing occurs at a frame that is one frame subsequent to the target frame (i.e., the next frame). The value 2'b00(=0) indicates that the Key Changing Timing occurs in the target frame.

The HD-SDI Link Number indicates the transmission mode of an HD-SDI signal between the encrypting apparatus 1 and the decrypting apparatus 2 (in this embodiment, the transmission mode of the meta-data overlapped and encrypted AV data). That is, for example, if a value of "0" is assigned to the HD-SDI Link Number, the Link-A of a single link (a transmission mode using one HD-SDI interface) or a dual link (a transmission mode using two HD-SDI interfaces) is selected. If a value of "1" is assigned to the "HD-SDI Link Number", the Link-B of a dual link is selected.

The LE Key 61-E contained in the ELEKP (more precisely, the LEKP before encryption) of the meta data 64-1 and 64-2 inserted into the target frame is used for encrypting the frames subsequent to the target frame. That is, the LE Key 61-E used for the target frame is included in the ELEKP (more precisely, the LEKP before encryption) of the meta data 64-1 and 64-2 inserted into a previous frame of the target frame.

Referring back to FIG. 1, as described above, in this embodiment, the encrypted AV data in which the meta data 64-1 to 64-3 are overlapped (i.e., the meta-data overlapped and encrypted AV data) is generated by the encrypting apparatus 1 and is transmitted (delivered) to the decrypting apparatus 2.

In the example shown in FIG. 1, the decrypting apparatus 2 having such a structure includes a meta data extracting unit 21 and a decrypting unit 22.

The meta data extracting unit 21 extracts information such as the meta data 64 (in this embodiment, the meta data 64-1 to 64-3) from the meta-data overlapped and encrypted AV data delivered from the encrypting apparatus 1. Thereafter, the meta data extracting unit 21 generates an LE Key 61-D, an AES input 62-D, and a Frame reset 63-D and delivers these data to the decrypting unit 22. The LE Key 61-D, the AES input 62-D, and the Frame reset 63-D are restored ones of the LE Key 61-E, the AES input 62-E, and the Frame reset 63-E that have been used for encrypting the encrypted AV data in the encrypting apparatus 1, respectively. Accordingly, from a different viewpoint, the meta data extracting unit 21 restores the LE Key 61-E, the AES input 62-E, and the Frame reset 63-E and delivers the restored ones to the decrypting unit 22.

The meta data extracting unit 21 is described in detail below with reference to FIG. 5.

In the example shown in FIG. 1, the decrypting unit 22 includes an AES decryption data generating unit 41 and an AV-data decrypting unit 42.

The AES decryption data generating unit 41 generates data 66 for directly decrypting the encrypted AV data (AV data that was encrypted using the AES) using the LE Key 61-D and the AES input 62-D delivered from the meta data extracting unit 21. Hereinafter, the data 66 is referred to as "AES decryption data 66". The AES decryption data generating unit 41 then delivers the AES decryption data 66 to the AV-data decrypting unit 42. That is, the AES decryption data 66 is decryption data corresponding to the AES encryption data 65.

The AV-data decrypting unit 42 decrypts the encrypted AV data using the AES decryption data 66 delivered from the AES decryption data generating unit 41. The AV-data decrypting unit 42 then externally outputs the resultant AV data (restored AV data). At that time, the AV-data decrypting unit 42 decrypts the encrypted AV data using the Frame reset 63-D delivered from the meta data extracting unit 21 on a frame-by-frame basis.

The meta data extracting unit 21 is described in detail next with reference to FIG. 5. FIG. 5 illustrates an exemplary configuration of the meta data extracting unit 21 in detail.

Figure 5:
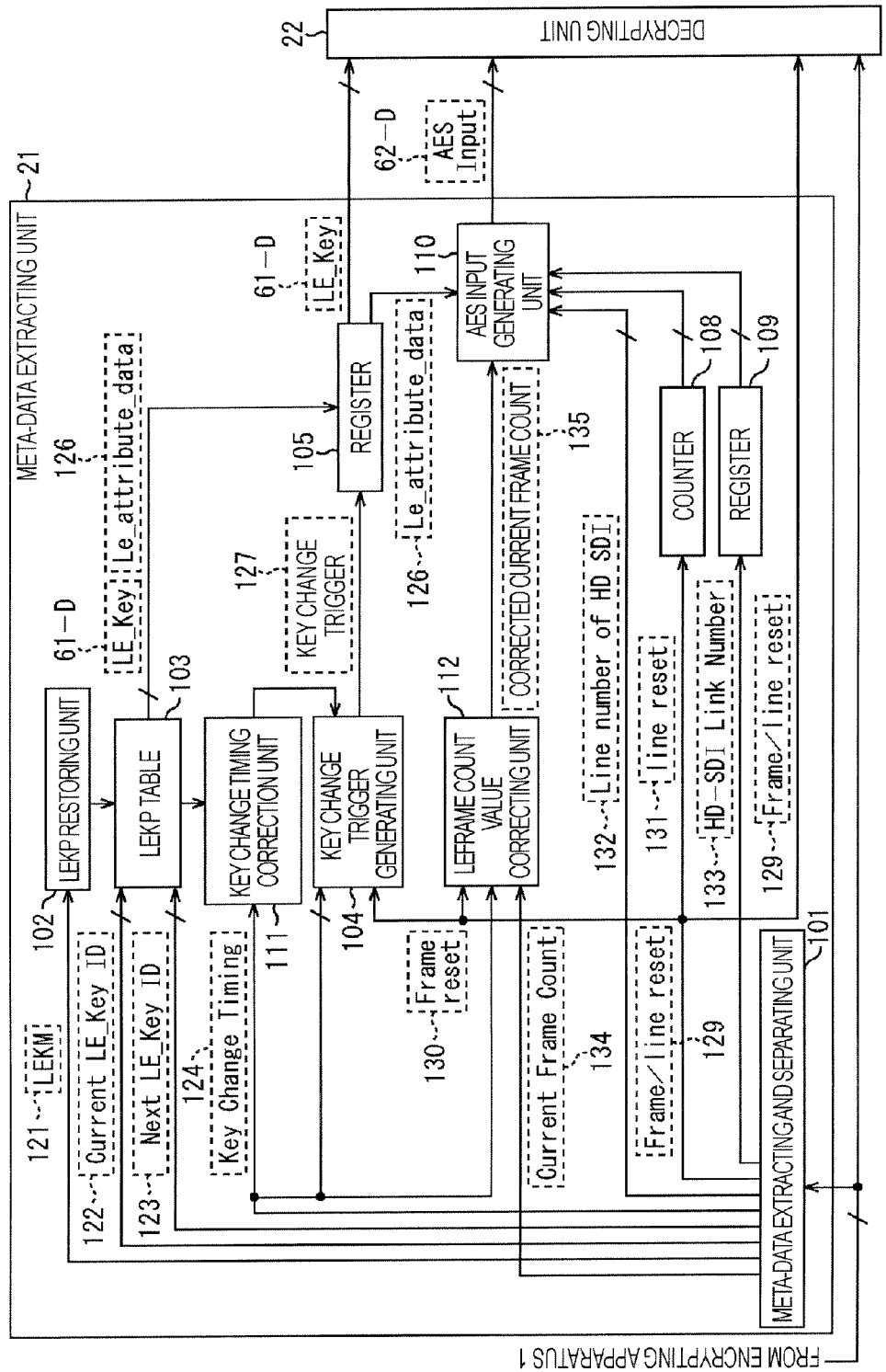
FIG. 5 is a block diagram of the detailed configuration of a meta-data extracting unit of the decrypting apparatus shown in FIG. 1.

As shown in FIG. 5, the meta data extracting unit 21 includes components from a meta data extracting and separating unit 101 to an LEFRAME count value correcting unit 112.

The meta data extracting and separating unit 101 extracts information such as the meta data 64 (in this embodiment, the meta data 64-1 to 64-3 shown in FIGS. 2 to 4) from the meta-data overlapped and encrypted AV data delivered from the encrypting apparatus 1. Additionally, the meta data extracting and separating unit 101 separates a variety of information included in the meta data 64.

More specifically, for example, as shown in FIG. 5, the meta data extracting and separating unit 101 extracts or separates an LEKM 121, a Current LE_key ID 122, a Next LE_key ID 123, a Key Change Timing 124, a Frame/line reset 129, an HD-SDI Link number 133, and a Current Frame Count 134.

The Frame/line reset 129 includes a Frame reset 130 and a line reset 131. As described above, the LEKM 121 is a value assigned to the User data of the meta data 64-1 and the meta data 64-2. The Current LE_key ID 122 is a value assigned to the Current LE_key ID of the meta data 64-3. The Next LE_key ID 123 is a value assigned to the Next LE_key ID of the meta data 64-3. The Key Change Timing 124 is a value assigned to the Key Change Timing of the meta data 64-3. The HD-SDI Link number 133 is a value assigned to the HD-SDI Link number of the meta data 64-3. The Current Frame Count 134 is a value assigned to the Current Frame Count of the meta data 64-3.

The LEKM 121 is delivered to an LEKP restoring unit 102. The Current LE_key ID 122 and the Next LE_key ID 123 are delivered to an LEKP table 103. The Key Change Timing 124 is delivered to a key change trigger generating unit 104, a key change timing correction unit 111, and the LEFRAME count value correcting unit 112. The Frame reset 130 is delivered to the key change trigger generating unit 104 and the LEFRAME count value correcting unit 112. The line reset 131 is delivered to a counter 108. The Frame/line reset 129 including the Frame reset 130 and the line reset 131 is delivered to the decrypting unit 22. The Frame/line reset 129 corresponds to the Frame reset 63-D shown in FIG. 1. The HD-SDI Link number 133 is delivered to a register 109. The Current Frame Count 134 is delivered to the LEFRAME count value correcting unit 112.

The LEKP restoring unit 102 restores the LEKP from the LEKM 121. The LEKP is stored in the LEKP table 103 in association with the Key ID of the LEKP. That is, as described above, the LEKM 121 is a value assigned to the User Data of the meta data 64-1 shown in FIG. 2 and the meta data 64-2 shown in FIG. 3. The User Data includes the ELEKP (indicated as "Elekp data" in FIGS. 2 and 3). As described above, the ELEKP is data obtained by encrypting the LEKP using the RSA. Accordingly, the LEKP restoring unit 102 encrypts the ELEKP contained in the LEKM 121 using a pair key (private key) of the public key for generation of the ELEKP. The LEKP restoring unit 102 then stores the obtained LEKP (restored LEKP) in the LEKP table 103 in association with the Key ID of the LEKP.

Thus, one or more LEKPs are stored in the LEKP table 103 in association with the Key ID that identifies the LEKP. As described above, the LEKP stored in the LEKP table 103 includes the LE Key 61-D (the restored LE Key 61-E shown in FIG. 1) and several additional information items. According to this embodiment, one of the additional information item is Le_attribute_data 126, which is one of the elements of the AES input 62-E shown in FIG. 1. Therefore, upon receiving a request from a register 105 (at a predetermined time after a key change command, which is described below, is received), the LEKP table 103 stores the LE Key 61-D (hereinafter referred to as a "Current LE Key 61-D") contained in the LEKP having the Key ID that is equal to the Current LE_key ID 122 and the Le_attribute_data 126 (hereinafter referred to as a "Current Le_attribute_data 126") in the register 105. Alternatively, the LEKP table 103 stores the LE Key 61-D (hereinafter referred to as a "Next LE Key 61-D") contained in the LEKP having the Key ID that is equal to the Next LE_key ID 123 and the Le_attribute_data 126 (hereinafter referred to as a "Next Le_attribute_data 126") in the register 105.

Every time the Frame reset 130 is delivered, the key change trigger generating unit 104 delivers a key change trigger 127 to the register 105. More specifically, for example, examples of the key change trigger 127 include a key-change enable command and a key-change disable command. One of these two commands is delivered to the register 105. In this case, the key change trigger generating unit 104 monitors the value of the Key Change Timing 124. When the value is equal to 2'b00(=0), that is, when the target frame is at the Key Change Timing, the key change trigger generating unit 104 delivers the key-change enable command to the register 105 as the key change trigger 127. In contrast, when the value is other than 2'b00(=0), the key change trigger generating unit 104 delivers the key-change disable command to the register 105 as the key change trigger 127.

In general, the register 105 stores the Current LE Key 61-D and the Current Le_attribute_data 126.

When receiving the key-change disable command as the key change trigger 127, the register 105 delivers the Current LE Key 61-D to the decrypting unit 22 and delivers the Current Le_attribute_data 126 to an AES input generating unit 110. Thus, the decrypting unit 22 decrypts the target frame (frame data encrypted with the AES) using the Current LE Key 61-D.

In contrast, upon receiving the key-change enable command as the key change trigger 127, the register 105 requests the update of the stored information to the LEKP table 103. Subsequently, as noted above, the LEKP table 103 stores the Next LE Key 61-D and the Next Le_attribute_data 126 at the point of time when the request is received from the register 105 in the register 105. That is, the Next LE Key 61-D and the Next Le_attribute_data 126 are stored in the register 105 as the new Current LE Key 61-D and Current Le_attribute_data 126 after the key change is performed. Thereafter, the Current LE Key 61-D (that was the Next LE Key 61-D) is delivered to the decrypting unit 22, and the Current Le_attribute_data 126 (that was the Next Le_attribute_data 126) is delivered to the AES input generating unit 110. Thus, in the decrypting unit 22, the LE Key 61-D for decryption is updated from the Current LE Key 61-D to the Next LE Key 61-D (i.e., the new Current LE Key 61-D). Thereafter, the decrypting unit 22 decrypts the target frame (frame data encrypted with the AES).

Every time the counter 108 receives the line reset 131, the counter 108 increments the count value by one and delivers the count value to the AES input generating unit 110.

The register 109 holds the HD-SDI Link number 133 and delivers the HD-SDI Link number 133 to the AES input generating unit 110 as needed.

Thus, the AES input generating unit 110 receives the Le_attribute_data 126 from the register 105, a Current Frame Count 135 which is a corrected value from the LEFRAME count value correcting unit 112 (described below), a Line number of HD SDI 132 from the meta data extracting and separating unit 101, the count value from the counter 108, and the HD-SDI Link number 133 from the register 109. Thereafter, the AES input generating unit 110 generates an AES input 62-D including at least the Le_attribute_data 126, the corrected Current Frame Count 135, the Line number of HD SDI 132, the count value from the counter 108, and the HD-SDI Link number 133. That is, the AES input generating unit 110 restores the AES input 62-E shown in FIG. 1 and delivers the AES input 62-D to the decrypting unit 22.

The key change timing correction unit 111 monitors the transition pattern of the Key Change Timing 124 and determines whether the transition pattern is normal. If the key change timing correction unit 111 determines that the transition pattern is abnormal (i.e., not normal) and correctable, the key change timing correction unit 111 outputs a correction command of the Key Change Timing to the key change trigger generating unit 104. Thus, the key change trigger generating unit 104 corrects the Key Change Timing.

The details of the key change timing correction unit 111 (including the operation thereof) are described below with reference to FIGS. 6 to 19.

The LEFRAME count value correcting unit 112 monitors the transition pattern of the Current Frame Count 134 from the meta data extracting and separating unit 101 while referencing the Key Change Timing 124. The LEFRAME count value correcting unit 112 then determines whether the transition pattern is normal. If the LEFRAME count value correcting unit 112 determines that the transition pattern is abnormal (i.e., not normal) and correctable, the LEFRAME count value correcting unit 112 corrects the value of the Current Frame Count 134 and outputs the corrected value to the AES input generating unit 110. However, if the LEFRAME count value correcting unit 112 determines that the transition pattern is normal, the LEFRAME count value correcting unit 112 directly outputs the value of the Current Frame Count 134 (without correcting the value) to the AES input generating unit 110.

Hereinafter, the information output from the LEFRAME count value correcting unit 112 to the AES input generating unit 110 is referred to as a "corrected Current Frame Count 135" regardless of whether the information has been corrected or not. That is, no correction is considered to be zero correction. All the information output from the LEFRAME count value correcting unit 112 to the AES input generating unit 110 is considered to be information having a corrected Current Frame Count 134. Accordingly, the information is referred to as a "corrected Current Frame Count 135". That is, as noted above, the corrected Current Frame Count 135 is delivered from the LEFRAME count value correcting unit 112 to the AES input generating unit 110.

The details of the LEFRAME count value correcting unit 112 (including the operation thereof) are described below with reference to FIGS. 20 to 23.

So far, an exemplary configuration of the encrypting/decrypting system according to an embodiment of the present invention has been described.

Figure 4:
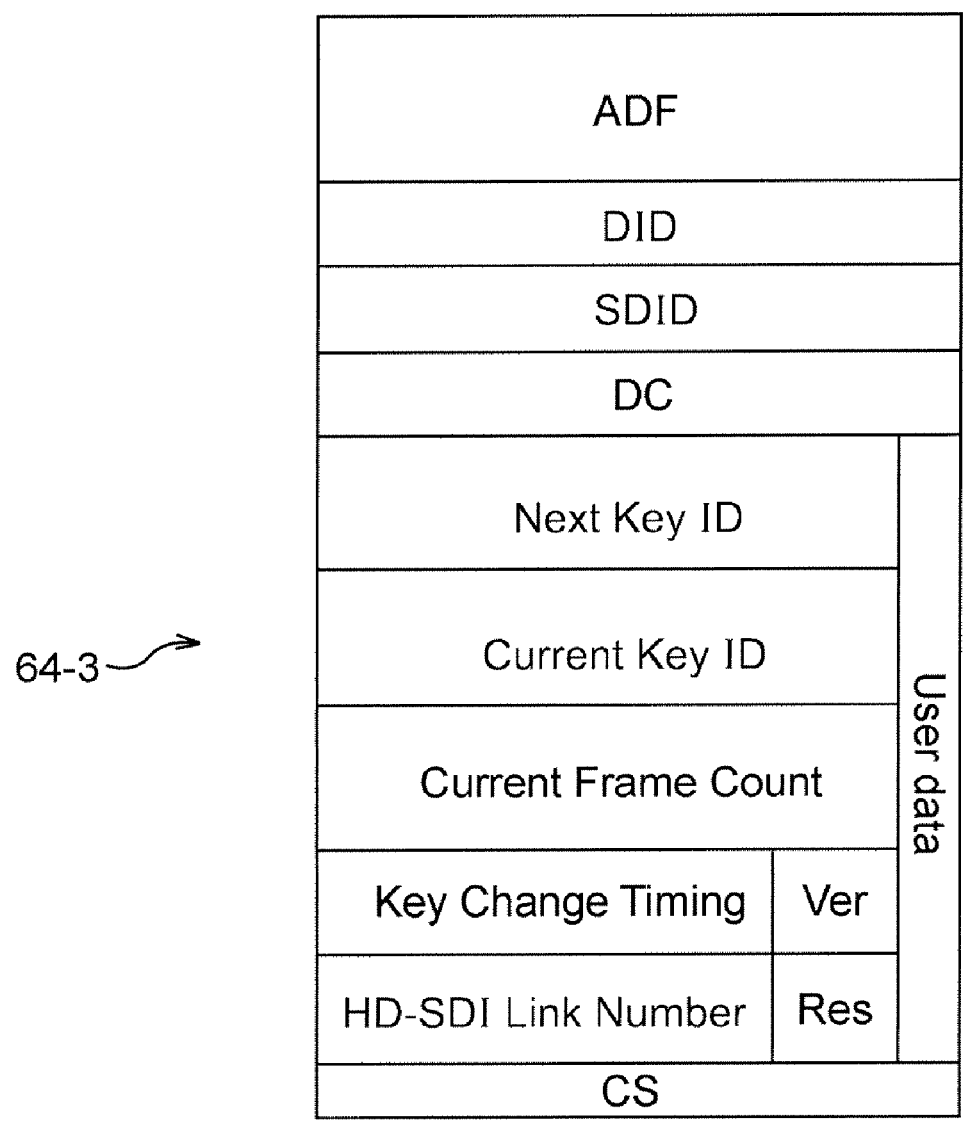
FIG. 4 illustrates an example of the structure of meta data including data used for the encrypting process performed by the encrypting apparatus shown in FIG. 1 and used for the decrypting process performed by the decrypting apparatus.

In the encrypting/decrypting system shown in FIG. 1, when the meta data overlapped and encrypted AV data generated by the encrypting apparatus 1 is transmitted to the decrypting apparatus 2, a transmission error may occur in the meta data 64-3 shown in FIG. 4 contained in the meta data overlapped and encrypted AV data.

Figure 6:
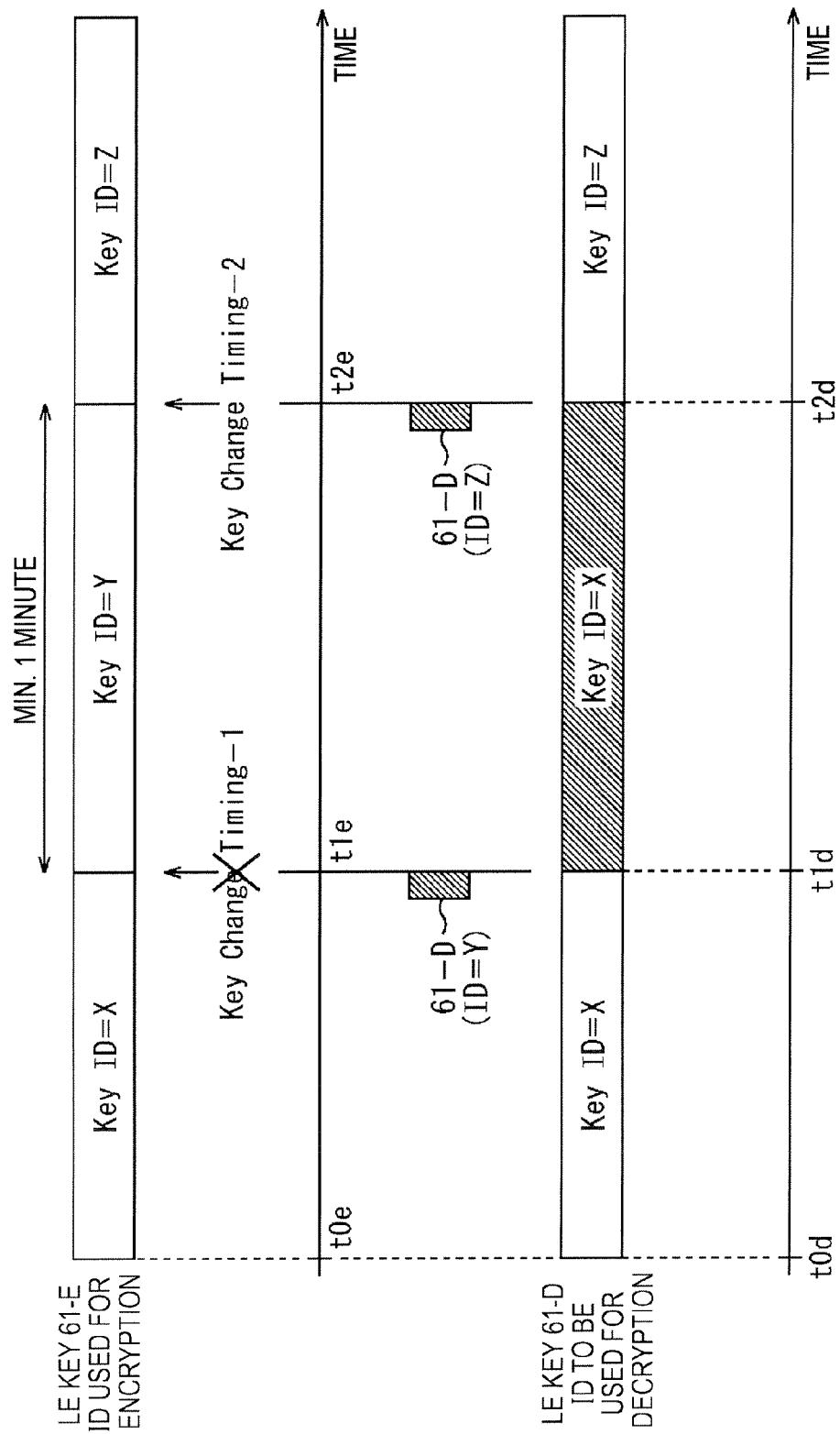
FIG. 6 illustrates an example of the process of updating an LE Key (AES key) used for the AV-data encryption process according to AES encryption.

If such a transmission error occurs and the key change timing correction unit 111 and the LEFRAME count value correcting unit 112 shown in FIG. 5 are not provided to the meta data extracting unit 21 of the decrypting apparatus 2, the following problem shown in FIG. 6 arises.

That is, according to the present embodiment, as described above, the LE Key (AES key) 61-E used for encrypting AV data with the AES is updated at a predetermined update period (the minimum update period is 1 minute). An example of the update process is illustrated in FIG. 6. That is, in the example shown in FIG. 6, the AV data is encrypted using the LE Key 61-E having the Key ID=X between a time t0e and a time t1e, which is a Key change Timing-1. After the time t1e has lapsed, the AV data is encrypted using the LE Key 61-E having the Key ID=Y between a time t1e and a time t2e, which is a Key change Timing-2. After the time t2e has lapsed, the AV data is encrypted using the LE Key 61-E having the Key ID=Z.

In this case, in order to decrypt the encrypted AV data using the LE Key 61-D having the Key ID=X, the decrypting apparatus 2 prepares the LE Key 61-D from the time t0d by a time t1d, which is the Key change Timing-1. That is, by the time t1d, which is the Key change Timing-1, the LE Key 61-D having the Key ID=Y is stored in the LEKP table 103 shown in FIG. 5 as the Next LE Key 61-D. When the time t1d is reached, in general (i.e., in the case of no transmission errors), the LE Key 61-D having the Key ID=Y is transferred from the LEKP table 103 to the register 105. Thereafter, the LE Key 61-D is transferred from the register 105 to the decrypting unit 22. Thus, the decrypting unit 22 can decrypt the encrypted AV data by using the LE Key 61-D having Key ID=Y.

At that time, as noted above, the key change trigger generating unit 104 determines whether the Key Change Timing-1 occurs. That is, the key change trigger generating unit 104 monitors the value of the Key Change Timing 124. When the value is 2'b00(=0), the key change trigger generating unit 104 determines that the target frame is at the Key Change Timing, and therefore, the key change trigger generating unit 104 delivers a key change enable command to the register 105 as the key change trigger 127.

As stated above, a key change (the update of the LE Key 61-D) occurs only in a frame having the Key Change Timing 124 whose value is 2'b00(a frame which the meta data 64-3 having the Key Change Timing 124 whose value is 2'b00 overlaps).

Accordingly, if a transmission error occurs in the meta data 64-3 and the key change trigger generating unit 104 cannot detect the value 2'b00, that is, if the value of the Key Change Timing 124 changes from 2'b00 to a different value due to the transmission error and the key change trigger generating unit 104 detects that different value, the key change trigger generating unit 104 cannot deliver a key-change enable command serving as the key change trigger 127 to the register 105. That is, even at the time t1d, the key change trigger generating unit 104 continues to deliver a key-change disable command serving as the key change trigger 127 to the register 105. Accordingly, as shown in FIG. 6, the register 105 continues to output the LE Key 61-D having the Key ID=X to the decrypting unit 22 until the time t2d, which is the next Key Change Timing-2, is reached. As a result, the decrypting unit 22 decrypts the encrypted AV data (frame), which has been encrypted using the LE Key 61-E having Key ID=Y, using the different AES key LE Key 61-D having Key ID=X. Thus, the decrypting unit 22 cannot properly decrypt the encrypted AV data.

Accordingly, to solve this problem, the present inventor has discovered the following method. That is, it is determined whether a transition pattern (continuity) from a value of the Key Change Timing 124 for the previous frame to a value of the Key Change Timing 124 for the target frame is a normal pattern or an abnormal pattern. If it is determined that the transition pattern is an abnormal pattern (and a correctable pattern), the update timing of the LE Key 61-D is corrected by interpolating the value of the Key Change Timing 124.

As used herein, the normal pattern refers to one of patterns 1 to 4 shown in FIG. 7. When the transition pattern from the value of the Key Change Timing 124 for the previous frame to the value of the Key Change Timing 124 for the target frame is written as (value of the Key Change Timing 124 for the immediately prior frame, value of the Key Change Timing 124 for the target frame), the following four patterns are shown. That is, a first pattern is (2'b11(=3), 2'b11(=3) or 2'b10(=2)). A second pattern is (2'b10(=2), 2'b01(=1)). A third pattern is (2'b01(=1), 2'b00(=0)). A fourth pattern is (2'b00(=0), 2'b11(=3)).

According to the present invention, this method is applied to the key change timing correction unit 111. Therefore, the key change timing correction unit 111 carries out the process according to a flow chart illustrated in FIGS. 8 and 9. That is, FIGS. 8 and 9 illustrate an example of a process that realizes such a method and also illustrate a flow chart of an example of a process carried out by the key change timing correction unit 111.

Figure 8:
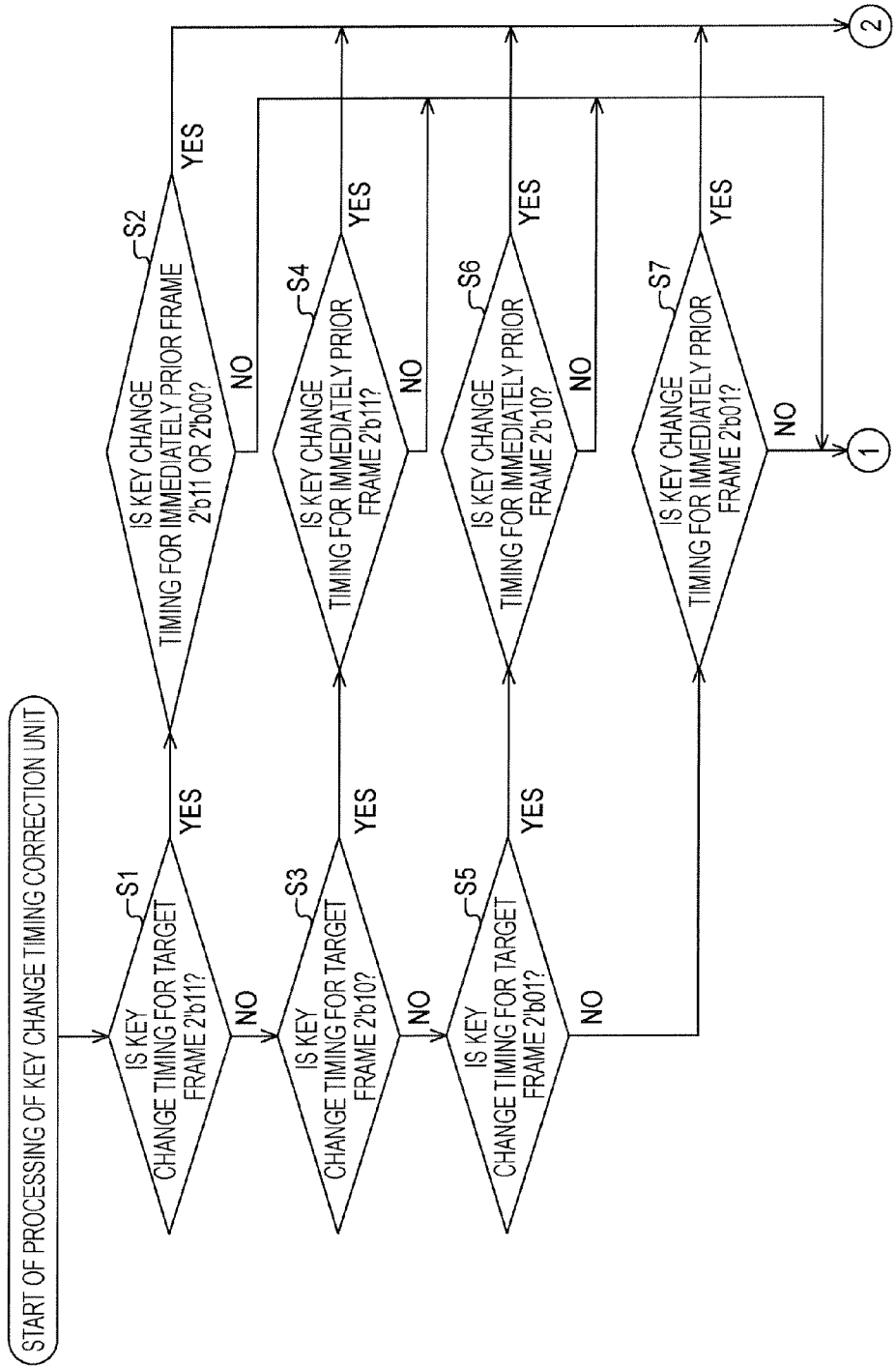
FIG. 8 is a flow chart illustrating an example of the operation performed by a key change timing correction unit of the meta-data extracting unit shown in FIG. 5.
Figure 9:
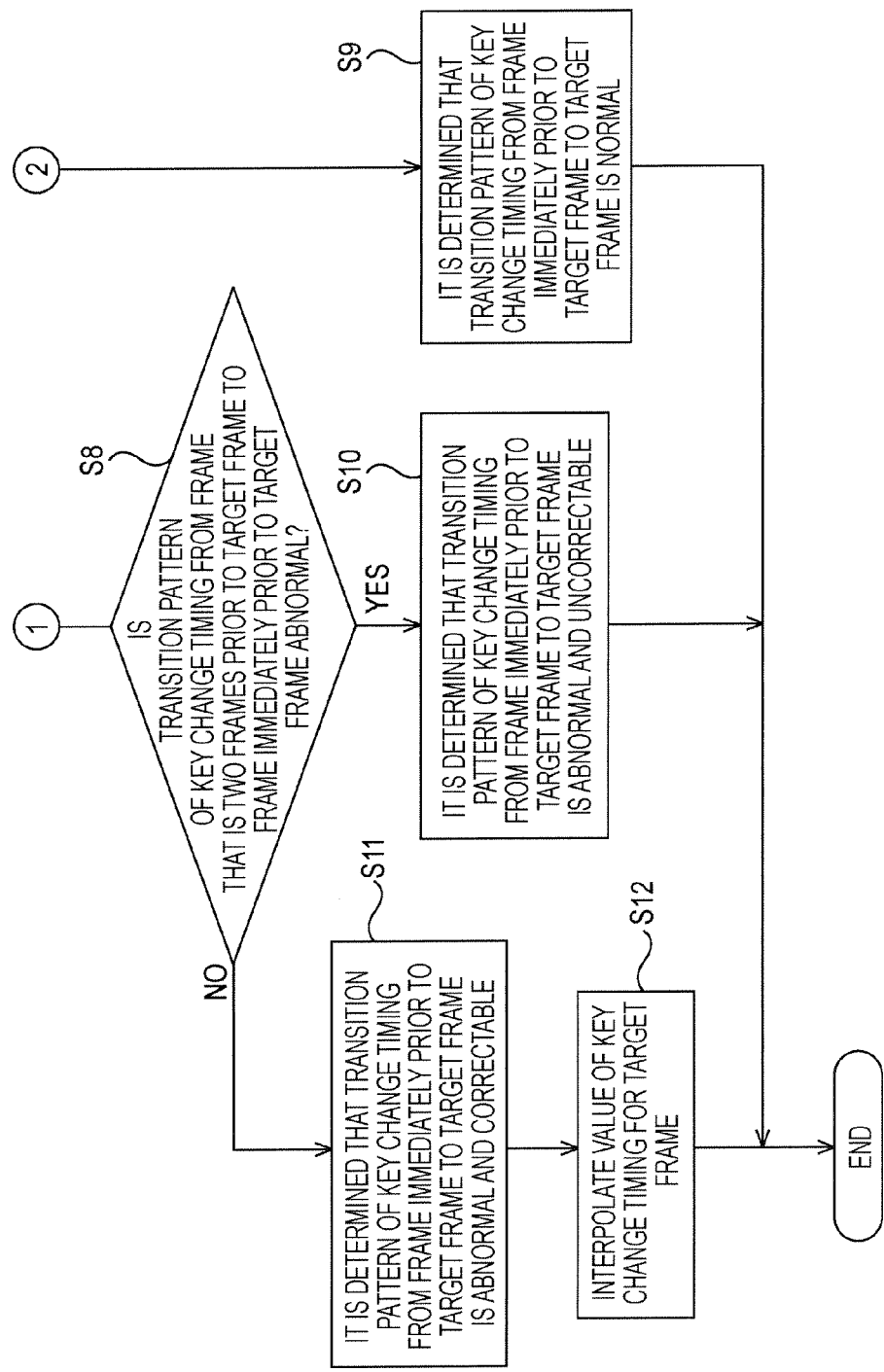
FIG. 9 is a flow chart illustrating an example of the operation performed by the key change timing correction unit of the meta-data extracting unit shown in FIG. 5.

It is noted that the process shown in FIGS. 8 and 9 is carried out for the target frame. That is, the process shown in FIGS. 8 and 9 is executed once for each frame (data item) of the encrypted AV data. More specifically, when a first frame becomes the target frame, the process shown in FIGS. 8 and 9 is executed once. Subsequently, a second frame subsequent to the first frame becomes the target frame, the process shown in FIGS. 8 and 9 is executed once.

As shown in FIG. 8, at step S1, the key change timing correction unit 111 determines whether the value of the Key Change Timing 124 for the target frame is 2'b11(=3).

If, at step S1, it is determined that the value of the Key Change Timing 124 for the target frame is 2'b11(=3), the process proceeds to step S2. At step S2, the key change timing correction unit 111 determines whether the value of the Key Change Timing 124 for the immediately prior frame is 2'b11 (=3) or 2'b00(=0).

If, at step S2, it is determined that the value of the Key Change Timing 124 for the immediately prior frame is 2'b11 (=3) or 2'b00(=0), the process proceeds to step S9 shown in FIG. 9. At step S9, the key change timing correction unit 111 determines that the transition pattern of the Key Change Timing 124 from the immediately prior frame to the target frame is a normal pattern (in this example, the pattern 1 or 4 shown in FIG. 7). Thus, the value of the Key Change Timing 124 for the target frame is not interpolated (corrected). Thereafter, the processing of the key change timing correction unit 111 for the target frame is completed.

However, if, at step S2 of FIG. 8, it is determined that the value of the Key Change Timing 124 for the immediately prior frame is neither 2'b11(=3) nor 2'b00(=0), that is, if it is determined that the value of the Key Change Timing 124 for the immediately prior frame is 2'b10 (=2) or 2'b01(=1), the process proceeds to step S8 of FIG. 9. At step S8, the key change timing correction unit 111 determines whether the transition pattern of the Key Change Timing 124 from the frame that is two frames prior to the target frame to the immediately prior frame was abnormal (i.e., the transition pattern determined in the process of the key change timing correction unit 111 when the immediately prior frame was the target frame, namely, the transition pattern determined in the previous process of the key change timing correction unit 111).

If, at step S8, it is determined that the transition pattern of the Key Change Timing 124 from the frame that is two frames prior to the target frame to the immediately prior frame was abnormal, the process proceeds to step S10. At step S10, the key change timing correction unit 111 determines that the transition pattern of the Key Change Timing 124 from the frame that is two frames prior to the target frame to the immediately prior frame was abnormal (i.e., the transition pattern is not equal to any one of the patterns 1 to 4) and is uncorrectable. Thus, the value of the Key Change Timing 124 for the target frame is not interpolated (corrected). Thereafter, the processing of the key change timing correction unit 111 for the target frame is completed.

In contrast, if, at step S8, it is determined that the transition pattern of the Key Change Timing 124 from the frame that is two frames prior to the target frame to the immediately prior frame was normal (i.e., not abnormal), the process proceeds to step S11. At step S11, the key change timing correction unit 111 determines that the transition pattern of the Key Change Timing 124 from the immediately prior frame to the target frame is an abnormal pattern (i.e., the transition pattern is not equal to any one of the patterns 1 to 4) and is correctable. Therefore, at step S12, the key change timing correction unit 111 interpolates the value of the Key Change Timing 124 for the target frame. Thereafter, the processing of the key change timing correction unit 111 for the target frame is completed. A description as to what value is an interpolated value at step S12 will be described below with reference to FIGS. 10 to 18.

Referring back to FIG. 8, if the value of the Key Change Timing 124 for the target frame is one of the values 2'b10(=2), 2'b01(=1), and 2'b00(=0), the test result at step S1 is determined to be "NO", and therefore the process proceeds to step S3. At step S3, the key change timing correction unit 111 determines whether the value of the Key Change Timing 124 for the target frame is 2'b10(=2).

If, at step S3, it is determined that the value of the Key Change Timing 124 for the target frame is 2'b10(=2), the process proceeds to step S4. At step S4, the key change timing correction unit 111 determines whether the value of the Key Change Timing 124 for the immediately prior frame is 2'b11 (=3).

If, at step S4, it is determined that the value of the Key Change Timing 124 for the immediately prior frame is 2'b11 (=3), it is determined at step S9 shown in FIG. 9 that the transition pattern of the Key Change Timing 124 from the immediately prior frame to the target frame is a normal pattern (in this example, the pattern 1 shown in FIG. 7). Thus, the value of the Key Change Timing 124 for the target frame is not interpolated (corrected). Thereafter, the processing of the key change timing correction unit 111 for the target frame is completed.

In contrast, if the value of the Key Change Timing 124 for the immediately prior frame is one of the values 2'b10 (=2), 2'b01(=1), and 2'b00(=0), the test result at step S4 is determined to be "NO". That is, it is determined that the value of the Key Change Timing 124 for the immediately prior frame in not 2'b11(=3). Thus, the process proceeds to step S8 shown in FIG. 9. Thereafter, the processes subsequent to step S8 are repeatedly carried out. That is, if the transition pattern of the Key Change Timing 124 from the frame that is two frames prior to the target frame to the immediately prior frame was abnormal, the value of the Key Change Timing 124 for the target frame is not interpolated (corrected). Thereafter, the processing of the key change timing correction unit 111 for the target frame is completed. However, if the transition pattern of the Key Change Timing 124 from the frame that is two frames prior to the target frame to the immediately prior frame was normal, the value of the Key Change Timing 124 for the target frame is interpolated. Thereafter, the processing of the key change timing correction unit 111 for the target frame is completed.

In addition, if the value of the Key Change Timing 124 for the target frame is one of 2'b01(=1) and 2'b00(=0), the test result at step S3 shown in FIG. 8 is determined to be "NO". Then, the process proceeds to step S5. At step S5, the key change timing correction unit 111 determines whether the value of the Key Change Timing 124 for the target frame is 2'b01 (=1).

If, at step S5, it is determined that the value of the Key Change Timing 124 for the target frame is 2'b01(=1), the process proceeds to step S6. At step S6, the key change timing correction unit 111 determines whether the value of the Key Change Timing 124 for the immediately prior frame is 2'b10 (=2).

If, at step S6, it is determined that the value of the Key Change Timing 124 for the immediately prior frame is 2'b10 (=2), it is determined at step S9 shown in FIG. 9 that the transition pattern of the Key Change Timing 124 from the immediately prior frame to the target frame is a normal pattern (in this example, the pattern 2 shown in FIG. 7). Thus, the value of the Key Change Timing 124 for the target frame is not interpolated (corrected). Thereafter, the processing of the key change timing correction unit 111 for the target frame is completed.

In contrast, if the value of the Key Change Timing 124 for the immediately prior frame is one of the values 2'b11(=3), 2'b01(=1), and 2'b00(=0), the test result at step S6 shown in FIG. 8 is determined to be "NO". That is, it is determined that the value of the Key Change Timing 124 for the immediately prior frame is not 2'b10(=2). Thus, the process proceeds to step S8 shown in FIG. 9. Thereafter, the processes subsequent to step S8 are repeatedly carried out. That is, if the transition pattern of the Key Change Timing 124 from the frame that is two frames prior to the target frame to the immediately prior frame is abnormal, the value of the Key Change Timing 124 for the target frame is not interpolated (corrected). Thereafter, the processing of the key change timing correction unit 111 for the target frame is completed. However, if the transition pattern of the Key Change Timing 124 from the frame that is two frames prior to the target frame to the immediately prior frame was normal, the value of the Key Change Timing 124 for the target frame is interpolated. Thereafter, the processing of the key change timing correction unit 111 for the target frame is completed.

Additionally, if the value of the Key Change Timing 124 for the target frame is 2'b00(=0), the test result at step S5 is determined to be "NO". The process then proceeds to step S7. At step S7, the key change timing correction unit 111 determines whether the value of the Key Change Timing 124 for the immediately prior frame is 2'b01(=1).

If, at step S7, it is determined that the value of the Key Change Timing 124 for the immediately prior frame is 2'b01 (=1), it is determined at step S9 shown in FIG. 9 that the transition pattern of the Key Change Timing 124 from the immediately prior frame to the target frame is a normal pattern (in this example, the pattern 3 shown in FIG. 7). Thus, the value of the Key Change Timing 124 for the target frame is not interpolated (corrected). Thereafter, the processing of the key change timing correction unit 111 for the target frame is completed.

In contrast, if the value of the Key Change Timing 124 for the immediately prior frame is one of the values 2'b11(=3), 2'b10(=2), and 2'b00(=0), the test result at step S7 shown in FIG. 8 is determined to be "NO". That is, it is determined that the value of the Key Change Timing 124 for the immediately prior frame in not 2'b01(=1). Thus, the process proceeds to step S8 shown in FIG. 9. Thereafter, the processes subsequent to step S8 are repeatedly carried out. That is, if the transition pattern of the Key Change Timing 124 from the frame that is two frames prior to the target frame to the immediately prior frame was abnormal, the value of the Key Change Timing 124 for the target frame is not interpolated (corrected). Thereafter, the processing of the key change timing correction unit 111 for the target frame is completed. However, if the transition pattern of the Key Change Timing 124 from the frame that is two frames prior to the target frame to the immediately prior frame was normal, the value of the Key Change Timing 124 for the target frame is interpolated. Thereafter, the processing of the key change timing correction unit 111 for the target frame is completed.

The processing of the key change timing correction unit 111 for the target frame is described in more detail next with reference to FIGS. 10 to 19.

Figure 17:
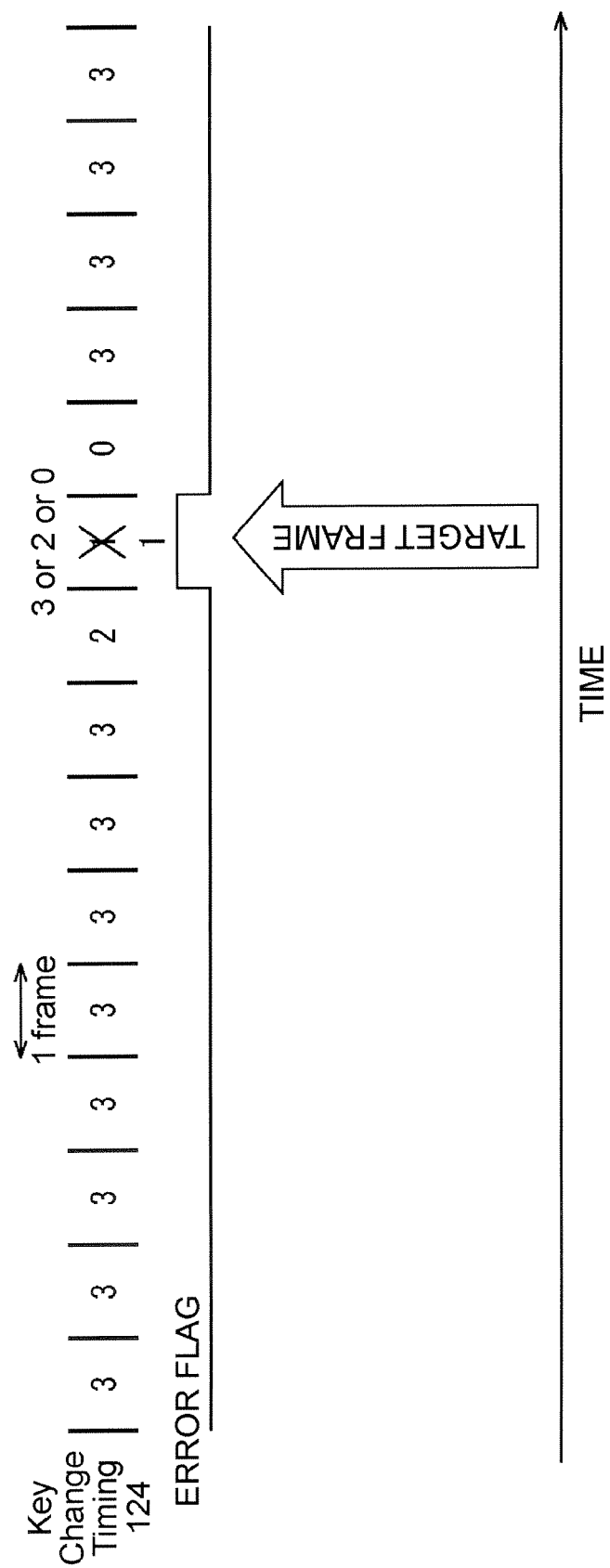
FIG. 17 illustrates an example of the processing result performed by the key change timing correction unit of the meta-data extracting unit shown in FIG. 5 according to the flow chart shown in FIGS. 8 and 9.
Figure 18:
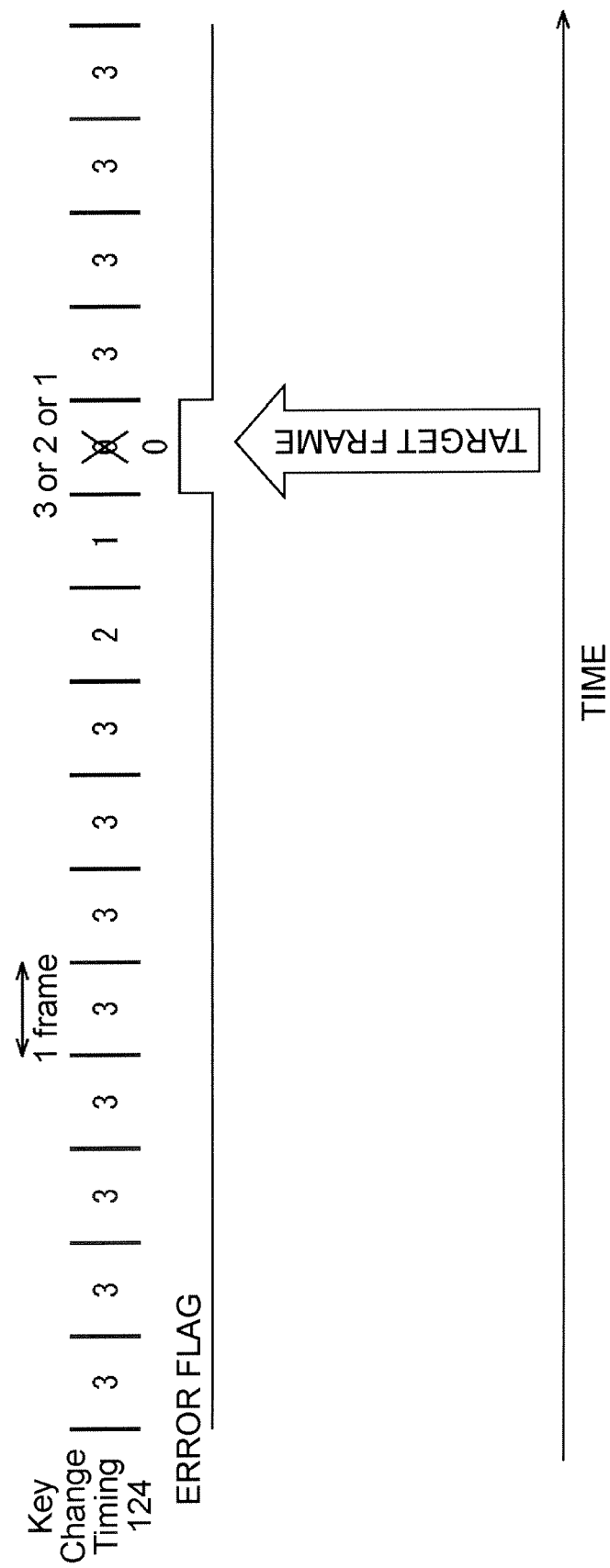
FIG. 18 illustrates an example of the processing result performed by the key change timing correction unit of the meta-data extracting unit shown in FIG. 5 according to the flow chart shown in FIGS. 8 and 9.
Figure 19:
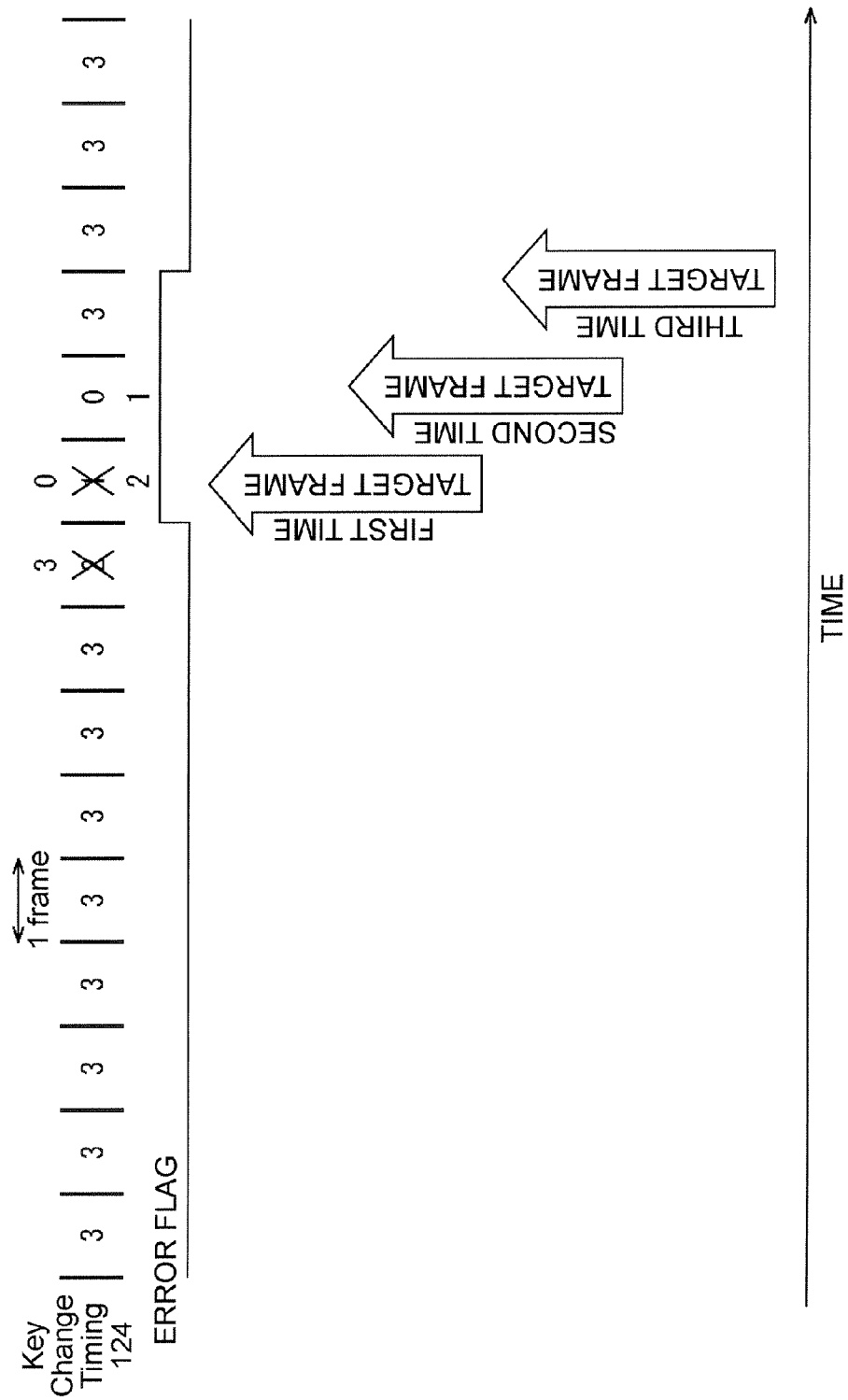
FIG. 19 illustrates an example of the processing result performed by the key change timing correction unit of the meta-data extracting unit shown in FIG. 5 in which the value of Key Change Timing for the target frame is interpolated using the transition of the value of Key Change Timing between three successive frames (the frame that is two frames prior to the target frame, the frame immediately prior to the target frame, and the target frame)

FIGS. 10 to 19 illustrate specific examples of the results of the processing performed by the key change timing correction unit 111 for the target frame. More specifically, FIGS. 10 to 18 illustrate the results of the processing performed by the key change timing correction unit 111 according to the above-described flow chart shown in FIGS. 8 and 9. However, FIG. 19 illustrates the result of the processing performed by the key change timing correction unit 111 according to a method different from the above-described flow chart shown in FIGS. 8 and 9. This method is also described below along with a description referring to FIG. 19.

In FIGS. 10 to 19, upper charts indicate the transition of the value of the Key Change Timing 124 for each of the frames. In the upper charts of FIGS. 10 to 19, the number with a strike-through symbol "X" thereon represents the value of the Key Change Timing 124 when the transition pattern of the Key Change Timing 124 from the immediately prior frame to the target frame is normal (a normal value). In addition, the number indicated above the strike-through symbol "X" is a value that is changed from the normal value due to the transmission error. The number indicated under the strike-through symbol "X" is the value interpolated at step S12 (see FIG. 9) by means of the key change timing correction unit 111.

In FIGS. 10 to 19, lower charts indicate timing diagrams of an error flag. The error flag indicates whether the transition pattern of the Key Change Timing 124 from the immediately prior frame to the target frame is abnormal or not. The error flag of "1" indicates an abnormal pattern whereas the error flag of "0" indicates a normal pattern. That is, if the error flag is ON ("1") for the target frame, the transition pattern of the Key Change Timing 124 from the immediately prior frame to the target frame is abnormal (i.e., the transition pattern matches neither one of the patterns 1 to 4 shown in FIG. 7). Therefore, if the error flag is ON ("1") for the immediately prior frame, it is determined at step S8 shown in FIG. 9 that the transition pattern of the Key Change Timing 124 from the frame that is two frames prior to the target frame to the immediately prior frame is abnormal (i.e., "YES"). Thus, the process proceeds to step S10.

Figure 10:
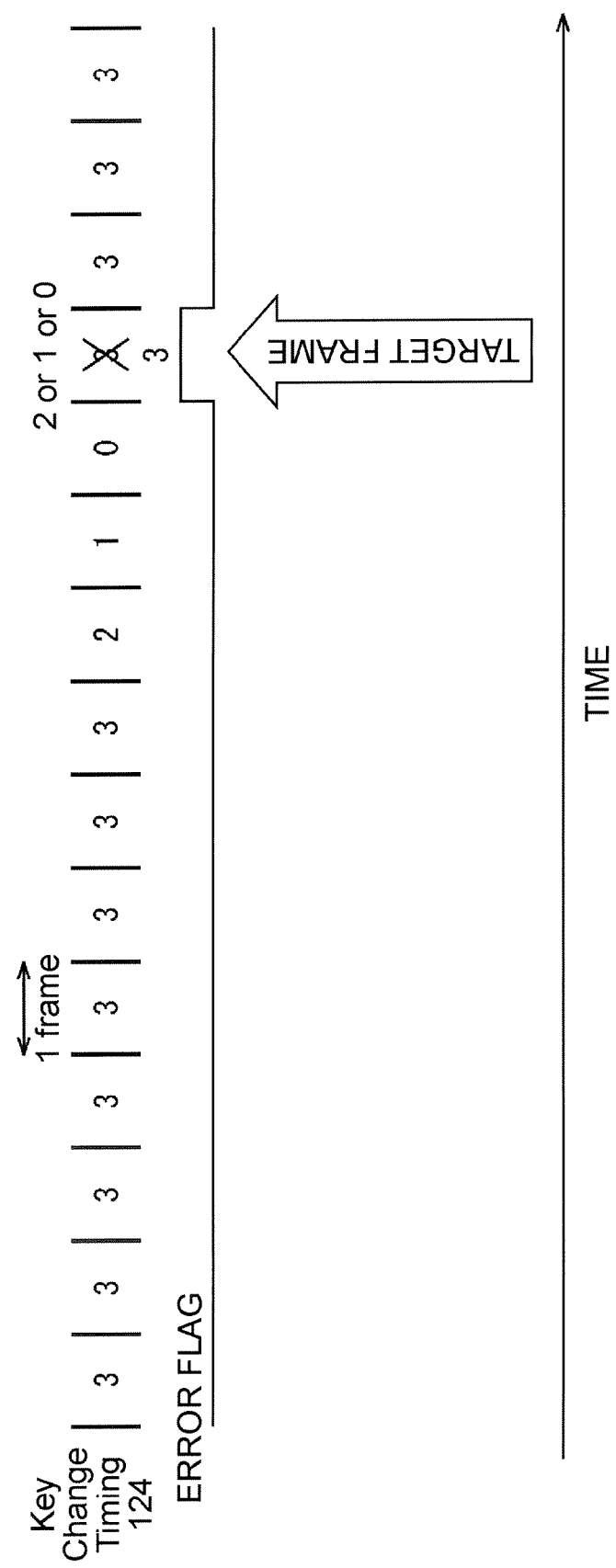
FIG. 10 illustrates an example of the processing result performed by the key change timing correction unit of the meta-data extracting unit shown in FIG. 5 according to a flow chart shown in FIGS. 8 and 9.

FIG. 10 illustrates an example in which the value of the Key Change Timing 124 for the immediately prior frame is 0(2'b00), and the value of the Key Change Timing 124 for the target frame should be 3(2'b11) in a normal case (see the pattern 4 in FIG. 7). However, the value is changed to one of 2(2'b10), 1(2'b01), and 0(2'b00) due to a transmission error.

In the example shown in FIG. 10, it is determined the test result at step S1 is "NO". Thereafter, the process proceeds to step S3 ("YES"), and then to step S4 ("NO"), and then to step S8. Alternatively, the process proceeds to step S3 ("NO"), and then to step S5 ("YES"), and then to step S6 ("NO"), and then to step S8. Alternatively, the process proceeds to step S3 ("NO"), and then to step S5 ("NO"), and then to step S7 ("NO"), and then to step S8. At step S8, the test result is determined to be "NO". Thereafter, the process proceeds to step S11 and then to step S12. At step S12, the value of the Key Change Timing 124 for the target frame is interpolated into 3. That is, in the example shown in FIG. 10, it is determined that the value of the Key Change Timing 124 for the immediately prior frame (i.e., 0(2'b00)) is reliable and the value of the Key Change Timing 124 for the target frame is interpolated into the value 3(2'b11) so that the pattern 4 shown in FIG. 7 is satisfied.

Figure 11:
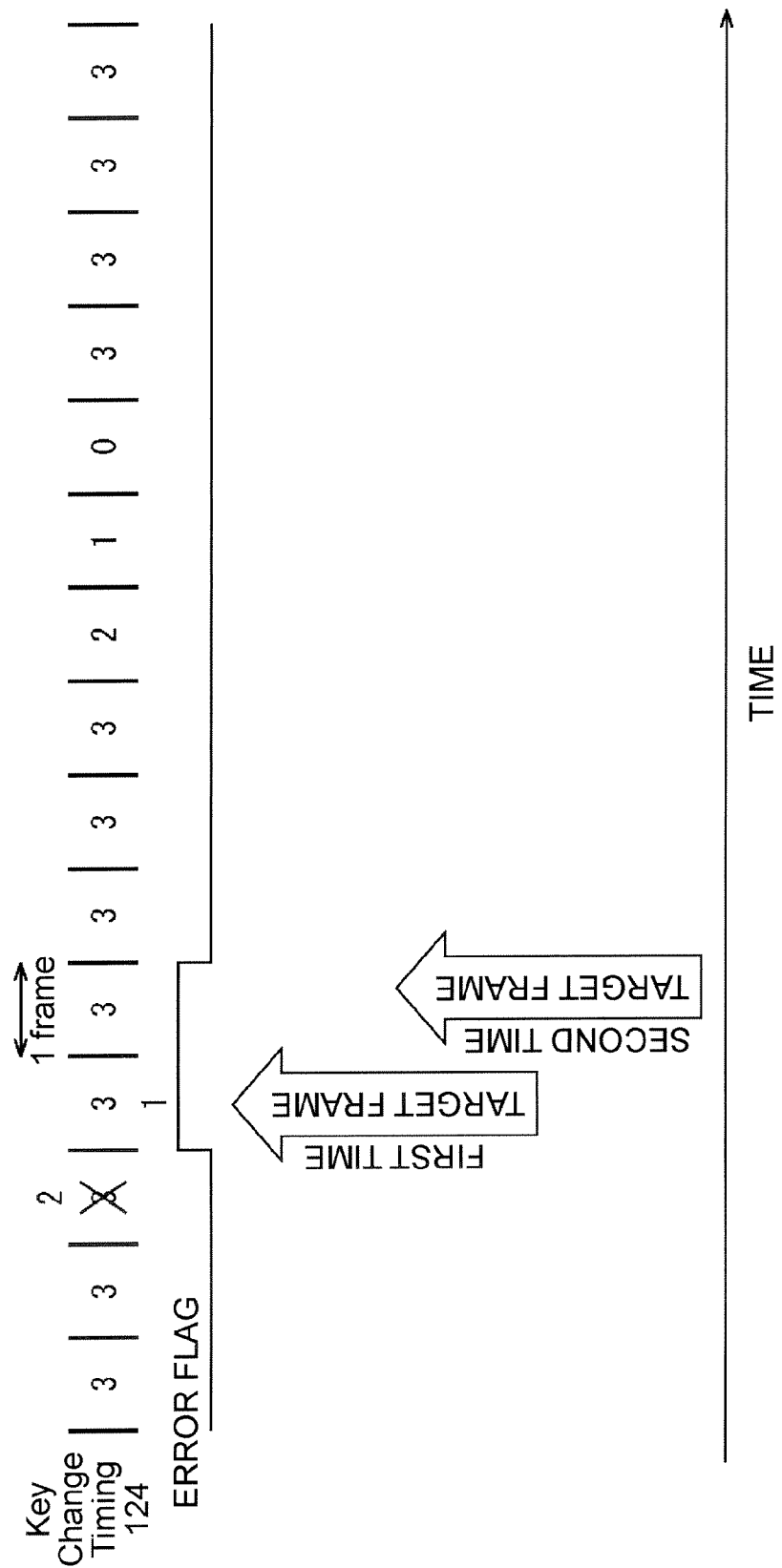
FIG. 11 illustrates an example of the processing result performed by the key change timing correction unit of the meta-data extracting unit shown in FIG. 5 according to the flow chart shown in FIGS. 8 and 9.

FIG. 11 illustrates the following example. Although, for a first time, the value of the Key Change Timing 124 for the immediately prior frame should be 3(2'b11) for the normal case, the value becomes 2(2'b01) due to a transmission error. Thereafter, the transmission error is recovered, and therefore, the value of the Key Change Timing 124 for the target frame (for the first time) returns to 3(2'b11), which is a normal value.

In the example shown in FIG. 11, the transition pattern of the Key Change Timing 124 from the frame that is two frames prior to the target frame to the immediately prior frame (for the first time) is (3(2'b11), 2(2'b10)). This pattern matches the pattern 1 of the normal patterns in FIG. 7. Therefore, it is determined that this pattern is normal.

Accordingly, in the process of the key change timing correction unit 111 for the target frame (for the first time), it is determined that the transition pattern of the Key Change Timing 124 from the immediately prior frame to the target frame is abnormal.

More specifically, in the first-time process of the key change timing correction unit 111, the processing proceeds to step S1 ("YES"), then to step S2 ("NO"), and then to step S8. At step S8, the test result is determined to be "NO". Then, the process proceeds to step S11. After the process at step S11 is completed, the process proceeds to step S12. At step S12, the value of the Key Change Timing 124 for the target frame is interpolated into 1. That is, in the example shown in FIG. 11, it is determined that the value of the Key Change Timing 124 for the immediately prior frame (i.e., 2(2'b10)) is reliable (although, in practice, this value is abnormal due to an transmission error) and the value of the Key Change Timing 124 for the target frame is interpolated into the value 1(2'b01) so that the pattern 2 shown in FIG. 7 is satisfied.

Subsequently, the next frame becomes the target frame. A second-time process of the key change timing correction unit 111 is carried out as follows. That is, the process proceeds to step S1 "YES", then to step S2 "NO", and then to step S8. At step S8, unlike the above-described case, the test result is determined to be "YES". At step S10, it is determined that the transition pattern of the Key Change Timing 124 from the immediately prior frame to the target frame (for the second time) is abnormal (i.e., the transition pattern matches neither one of the patterns 1 to 4 in FIG. 7) and is uncorrectable. Thus, the value of the Key Change Timing 124 for the target frame is not interpolated (corrected), and therefore, the value 3(2'b11) continues to be used.

It should be noted that, even though the interpolated value is a wrong value, this wrong value has no relation to the value of the Key Change Timing 124 "0(2'b00)", that is, has no relation to the update of the LE Key 61-D when the key change timing occurs. Consequently, no problems arise. As used herein, the term "no relation" means that the value of the Key Change Timing 124 is not mistakenly interpolated to 0(2'b00), and does not mean the value 0(2'b00) cannot be detected as a value of the Key Change Timing 124.

Figure 12:
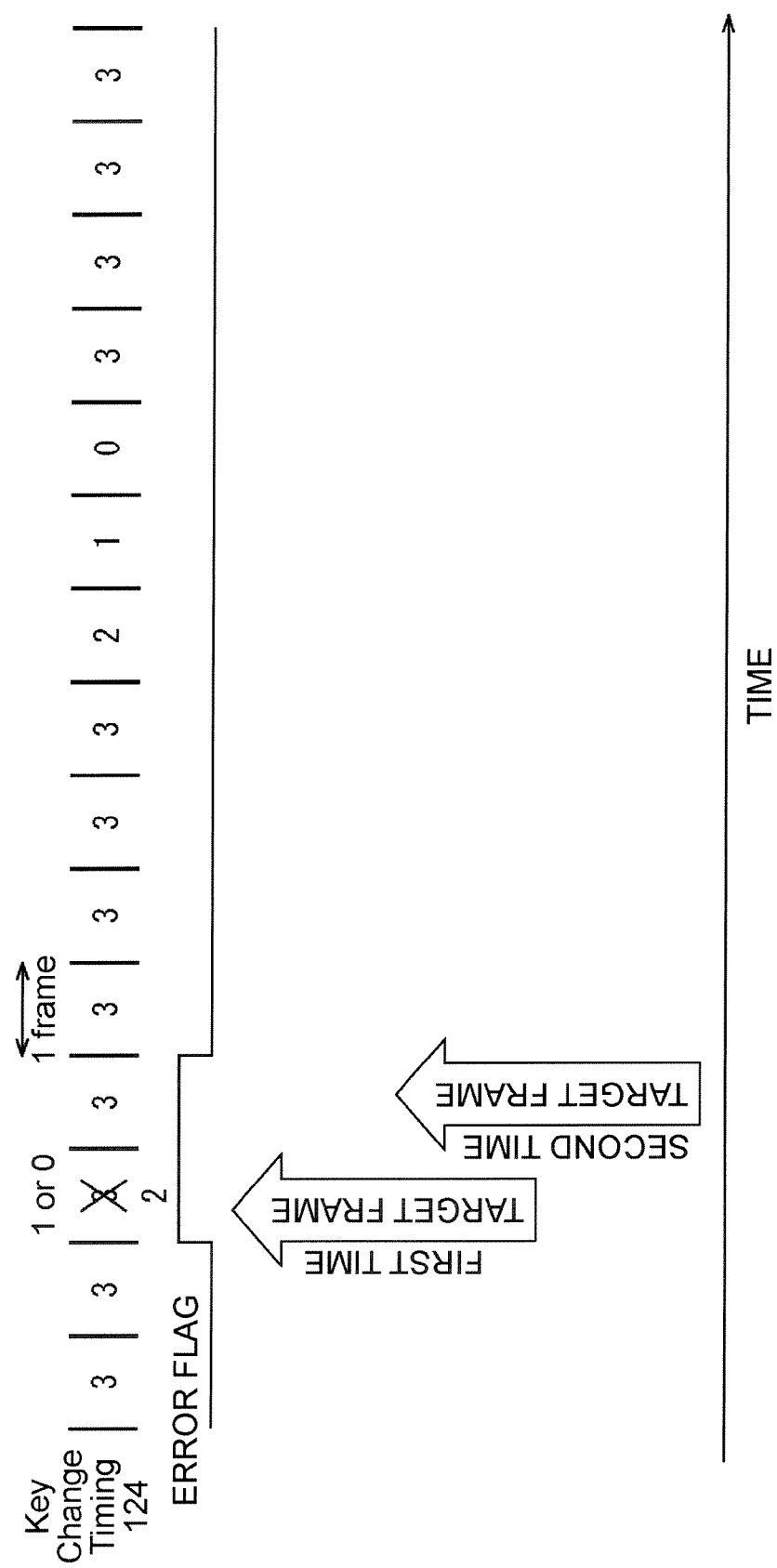
FIG. 12 illustrates an example of the processing result performed by the key change timing correction unit of the meta-data extracting unit shown in FIG. 5 according to the flow chart shown in FIGS. 8 and 9.

FIG. 12 illustrates an example in which, although the value of the Key Change Timing 124 for the target frame should be 3(2'b11) for a normal case (in a first-time process), the value is changed to 1(2'b01) or 0(2'b00) due to a transmission error.

In the example shown in FIG. 12, in the first process of the key change timing correction unit 111, the processing proceeds to step S1 ("NO"), then to step S3 ("NO"), then to step S5 ("YES"), then to step S6 ("NO"), and then to step S8. Alternatively, the processing proceeds to step S1 ("NO"), then to step S3 ("NO"), then to step S5 ("NO"), then to step S7 ("NO"), and then to step S8. At step S8, the test result is determined to be "NO". Then, the process proceeds to step S11. After the process at step S11 is completed, the process proceeds to step S12. At step S12, the value of the Key Change Timing 124 for the target frame is interpolated into 2(2'b10). That is, in the example shown in FIG. 12, it is determined that the value of the Key Change Timing 124 for the immediately prior frame (i.e., 3(2'b11)) is reliable and the value of the Key Change Timing 124 for the target frame is interpolated into the value 2(2'b10) so that the pattern (3(2'b11), 2(2'b10)) in the pattern 1 of FIG. 7 is satisfied.

Subsequently, the next frame becomes the target frame. A second process of the key change timing correction unit 111 is carried out as follows. That is, the process proceeds to step S1 "YES", then to step S2 "NO", and then to step S8. At step S8, unlike the above-described case, the test result is determined to be "YES". At step S10, it is determined that the transition pattern of the Key Change Timing 124 from the immediately prior frame to the target (for the second time) is abnormal (i.e., the transition pattern matches neither one of the patterns 1 to 4 in FIG. 7) and is uncorrectable. Thus, the value of the Key Change Timing 124 for the target frame is not interpolated (corrected), and therefore, the value 3 (2'b11) continues to be used.

It should be noted that, even though the interpolated value is a wrong value, this wrong value has no relation to the value of the Key Change Timing 124 "0(2'b00)", that is, has no relation to the update of the LE Key 61-D for decryption when the key change timing occurs. Consequently, no problems arise. As used herein, the term "no relation" means that the value of the Key Change Timing 124 is not mistakenly interpolated to 0(2'b00), and therefore, the value 0(2'b00) can be detected as a value of the Key Change Timing 124.

Figure 13:
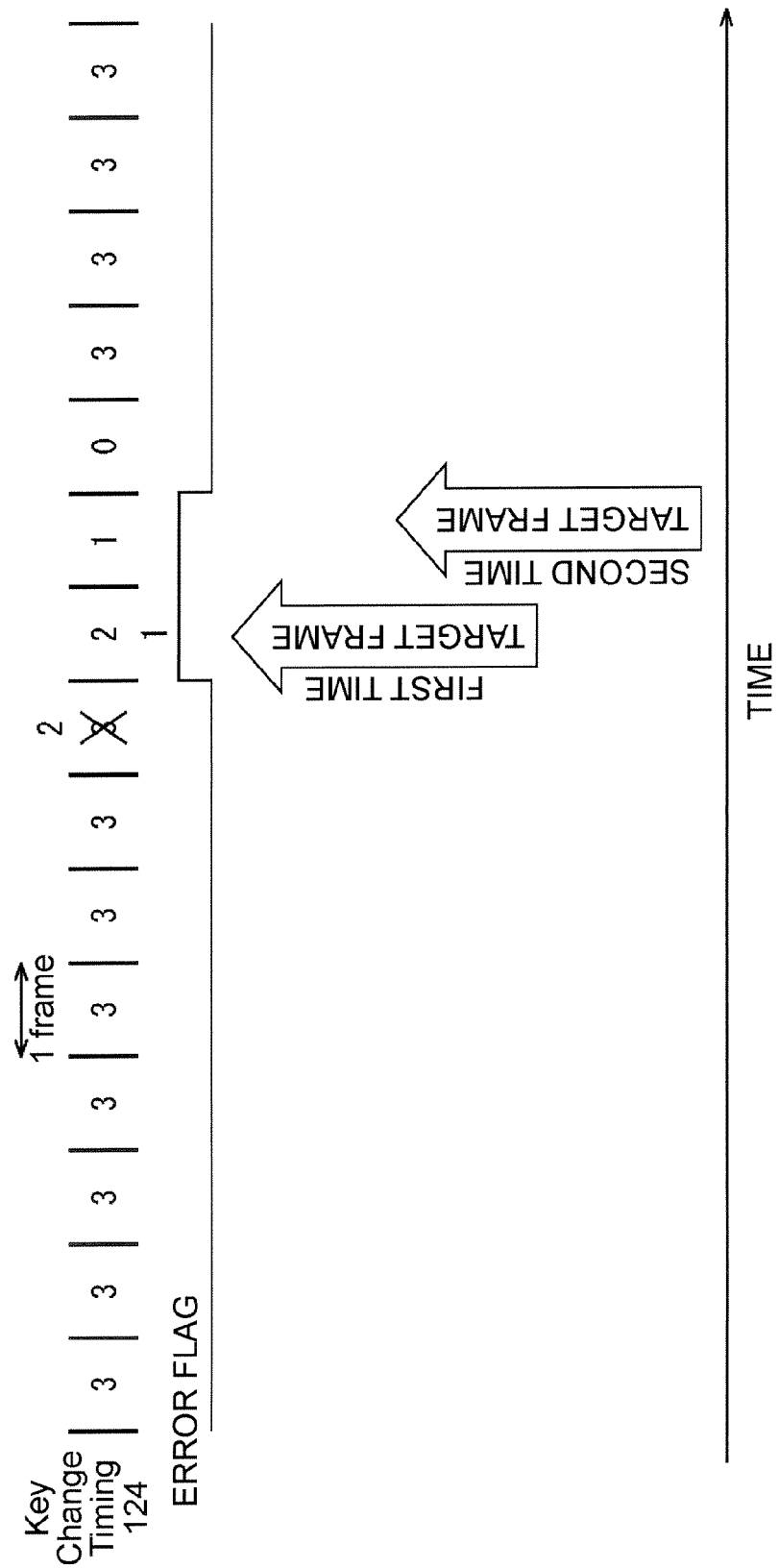
FIG. 13 illustrates an example of the processing result performed by the key change timing correction unit of the meta-data extracting unit shown in FIG. 5.

FIG. 13 illustrates the following example. Although, for a first time, the value of the Key Change Timing 124 for the immediately preceding frame should be 3(2'b11) for the normal case, the value becomes 2(2'b10) due to a transmission error. Thereafter, the transmission error is recovered, and therefore, the value of the Key Change Timing 124 for the target frame (for the first time) returns to 2(2'b10), which is a normal value.

In the example shown in FIG. 13, the transition pattern of the Key Change Timing 124 from the frame that is two frames prior to the target frame to the immediately prior frame (for the first time) is (3(2'b11), 2(2'b10)). This pattern matches the pattern 1 of the normal patterns in FIG. 7. Therefore, it is determined that this pattern is normal.

Accordingly, in the process of the key change timing correction unit 111 for the target frame (for the first time), it is determined that the transition pattern of the Key Change Timing 124 from the immediately prior frame to the target frame is abnormal.

More specifically, in the first process of the key change timing correction unit 111, the processing proceeds to step S1 ("NO"), then to step S3 ("YES"), then to step S4 ("NO") and then to step S8. At step S8, the test result is determined to be "NO". Then, the process proceeds to step S11. After the process at step S11 is completed, the process proceeds to step S12. At step S12, the value of the Key Change Timing 124 for the target frame is interpolated into 1(2'b01). That is, in the example shown in FIG. 13, it is determined that the value of the Key Change Timing 124 for the immediately prior frame (i.e., 2(2'b10)) is reliable (although, in practice, this value is abnormal due to an transmission error) and the value of the Key Change Timing 124 for the target frame is interpolated into the value 1(2'b01) so that the pattern 2 shown in FIG. 7 is satisfied.

Subsequently, the next frame becomes the target frame. A second process of the key change timing correction unit 111 is carried out as follows. That is, the process proceeds to step S1 "NO", then to step S3 "NO", then to step S5 "YES", then to step S6 "NO", and then to step S8. At step S8, unlike the above-described case, the test result is determined to be "YES". At step S10, it is determined that the transition pattern of the Key Change Timing 124 from the immediately prior frame to the target frame (for the second time) is abnormal (i.e., the transition pattern matches neither one of the patterns 1 to 4 in FIG. 7) and is uncorrectable. Thus, the value of the Key Change Timing 124 for the target frame is not interpolated (corrected), and therefore, the value 1(2'b01) continues to be used.

It should be noted that, even though the interpolated value is a wrong value, this wrong value has no relation to the value of the Key Change Timing 124 "0(2'b00)", that is, has no relation to the update of the LE Key 61-D for decryption when the key change timing occurs. Consequently, no problems arise. As used herein, the term "no relation" means that the value of the Key Change Timing 124 is not mistakenly interpolated to 0(2'b00), and therefore, the value 0(2'b00) can be detected as a value of the Key Change Timing 124.

Figure 14:
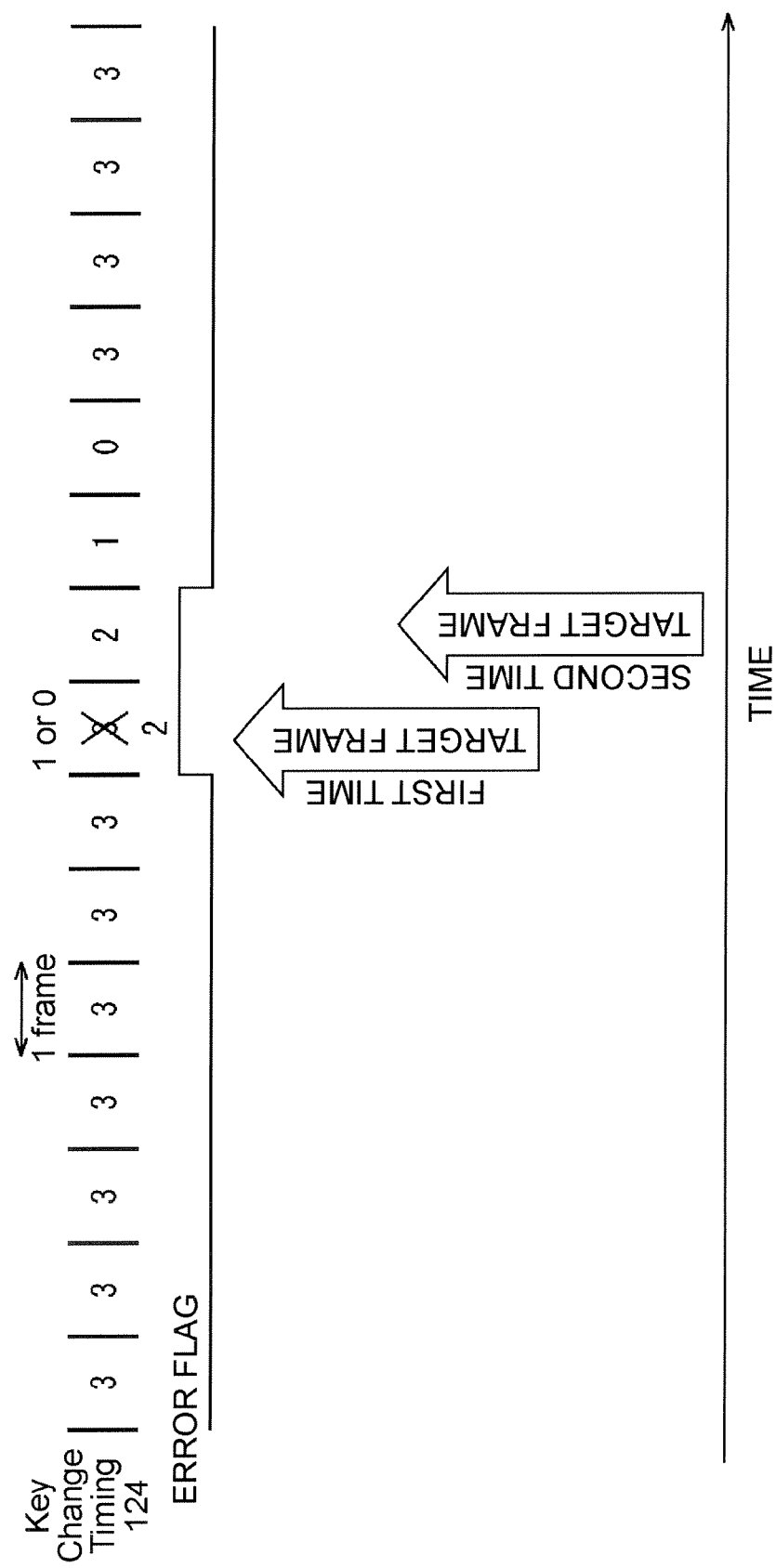
FIG. 14 illustrates an example of the processing result performed by the key change timing correction unit of the meta-data extracting unit shown in FIG. 5 according to the flow chart shown in FIGS. 8 and 9.

FIG. 14 illustrates an example in which, although the value of the Key Change Timing 124 for the target frame should be 3(2'b11) for a normal case, the value is changed to 1(2'b01) or 0(2'b00) due to a transmission error.

In the example shown in FIG. 14, in the first process of the key change timing correction unit 111, the processing proceeds to step S1 ("NO"), then to step S3 ("NO"), then to step S5 ("YES"), then to step S6 ("NO"), and then to step S8. Alternatively, the processing proceeds to step S1 ("NO"), then to step S3 ("NO"), then to step S5 ("NO"), then to step S7 ("NO"), and then to step S8. At step S8, the test result is determined to be "NO". Then, the process proceeds to step S11. After the process at step S11 is completed, the process proceeds to step S12. At step S12, the value of the Key Change Timing 124 for the target frame is interpolated into 2(2'b10). That is, in the example shown in FIG. 14, it is determined that the value of the Key Change Timing 124 for the immediately prior frame (i.e., 3(2'b11)) is reliable and the value of the Key Change Timing 124 for the target frame is interpolated into the value 2(2'b10) so that the pattern (3(2'b11), 2(2'b10)) in the pattern 1 of FIG. 7 is satisfied.

Subsequently, the next frame becomes the target frame. A second process of the key change timing correction unit 111 is carried out as follows. That is, the process proceeds to step S1 "NO", then to step S3 "YES", then to step S4 "NO", and then to step S8. At step S8, unlike the above-described case, the test result is determined to be "YES". At step S10, it is determined that the transition pattern of the Key Change Timing 124 from the immediately prior frame to the target (for the second time) is abnormal (i.e., the transition pattern matches neither one of the patterns 1 to 4 in FIG. 7) and is uncorrectable. Thus, the value of the Key Change Timing 124 for the target frame is not interpolated (corrected), and therefore, the value 2(2'b10) continues to be used.

It should be noted that, even though the interpolated value is a wrong value, this wrong value has no relation to the value of the Key Change Timing 124 "0(2'b00)", that is, has no relation to the update of the LE Key 61-D for decryption when the key change timing occurs. Consequently, no problems arise. As used herein, the term "no relation" means that the value of the Key Change Timing 124 is not mistakenly interpolated to 0(2'b00), and therefore, the value 0(2'b00) can be detected as a value of the Key Change Timing 124.

Figure 15:
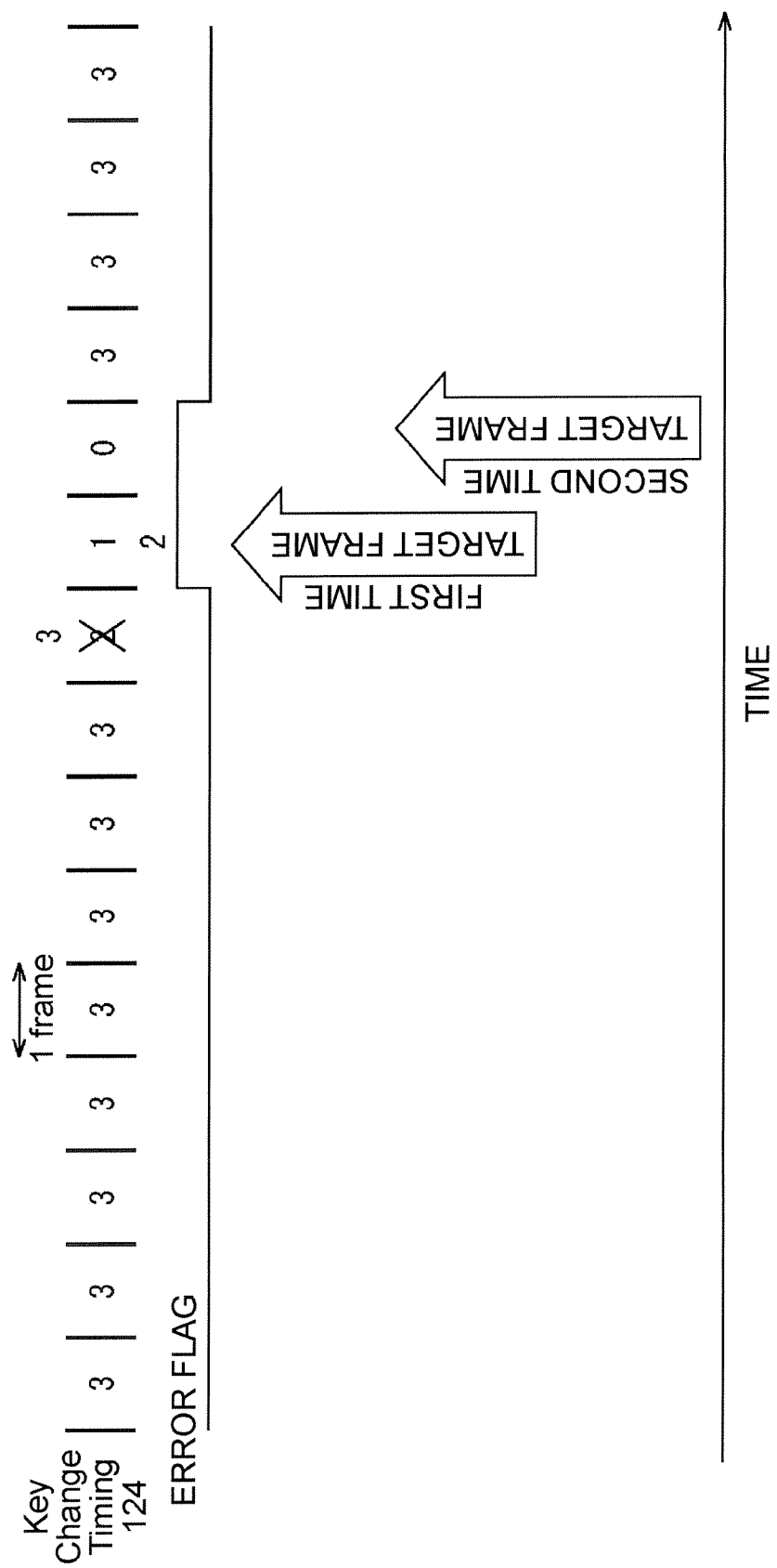
FIG. 15 illustrates an example of the processing result performed by the key change timing correction unit of the meta-data extracting unit shown in FIG. 5 according to the flow chart shown in FIGS. 8 and 9.

FIG. 15 illustrates the following example. Although, for a first time, the value of the Key Change Timing 124 for the immediately preceding frame should be 2(2'b10) for the normal case, the value becomes 3(2'b11) due to a transmission error. Thereafter, the transmission error is recovered, and therefore, the value of the Key Change Timing 124 for the target frame (for the first time) returns to 1(2'b01), which is a normal value.

In the example shown in FIG. 15, the transition pattern of the Key Change Timing 124 from the frame that is two frames prior to the target frame to the immediately prior frame (for the first time) is (3(2'b11), 3(2'b11)). This pattern matches the pattern 1 of the normal patterns in FIG. 7. Therefore, it is determined that this pattern is normal.

Accordingly, in the process of the key change timing correction unit 111 for the target frame (for the first time), it is determined that the transition pattern of the Key Change Timing 124 from the immediately prior frame to the target frame is abnormal.

More specifically, in the first process of the key change timing correction unit 111, the processing proceeds to step S1 ("NO"), then to step S3 ("NO"), then to step S5 ("YES"), then to step S6 ("NO"), and then to step S8. At step S8, the test result is determined to be "NO". Then, the process proceeds to step S11. After the process at step S11 is completed, the process proceeds to step S12. At step S12, the value of the Key Change Timing 124 for the target frame is interpolated into 2(2'b10). That is, in the example shown in FIG. 15, it is determined that the value of the Key Change Timing 124 for the immediately prior frame (i.e., 3(2'b11)) is reliable (although, in practice, this value is abnormal due to an transmission error) and the value of the Key Change Timing 124 for the target frame is interpolated into the value 2(2'b10) so that the pattern (3(2'b11), 2(2'b10)) of the pattern 1 shown in FIG. 7 is satisfied.

Subsequently, the next frame becomes the target frame. A second process of the key change timing correction unit 111 is carried out as follows. That is, the process proceeds to step S1 "NO", then to step S3 "NO", then to step S5 "NO", then to step S7 "NO", and then to step S8. At step S8, unlike the above-described case, the test result is determined to be "YES". At step S10, it is determined that the transition pattern of the Key Change Timing 124 from the immediately prior frame to the target frame (for the second time) is abnormal (i.e., the transition pattern matches neither one of the patterns 1 to 4 in FIG. 7) and is uncorrectable. Thus, the value of the Key Change Timing 124 for the target frame is not interpolated (corrected), and therefore, the value 0(2'b00) continues to be used.

It should be noted that, even though the interpolated value is a wrong value, this wrong value has no relation to the value of the Key Change Timing 124 "0(2'b00)", that is, has no relation to the update of the LE Key 61-D for decryption when the key change timing occurs. Consequently, no problems arise. As used herein, the term "no relation" means that the value of the Key Change Timing 124 is not mistakenly interpolated to 0(2'b00), and therefore, the value 0(2'b00) can be detected as a value of the Key Change Timing 124.

Figure 16:
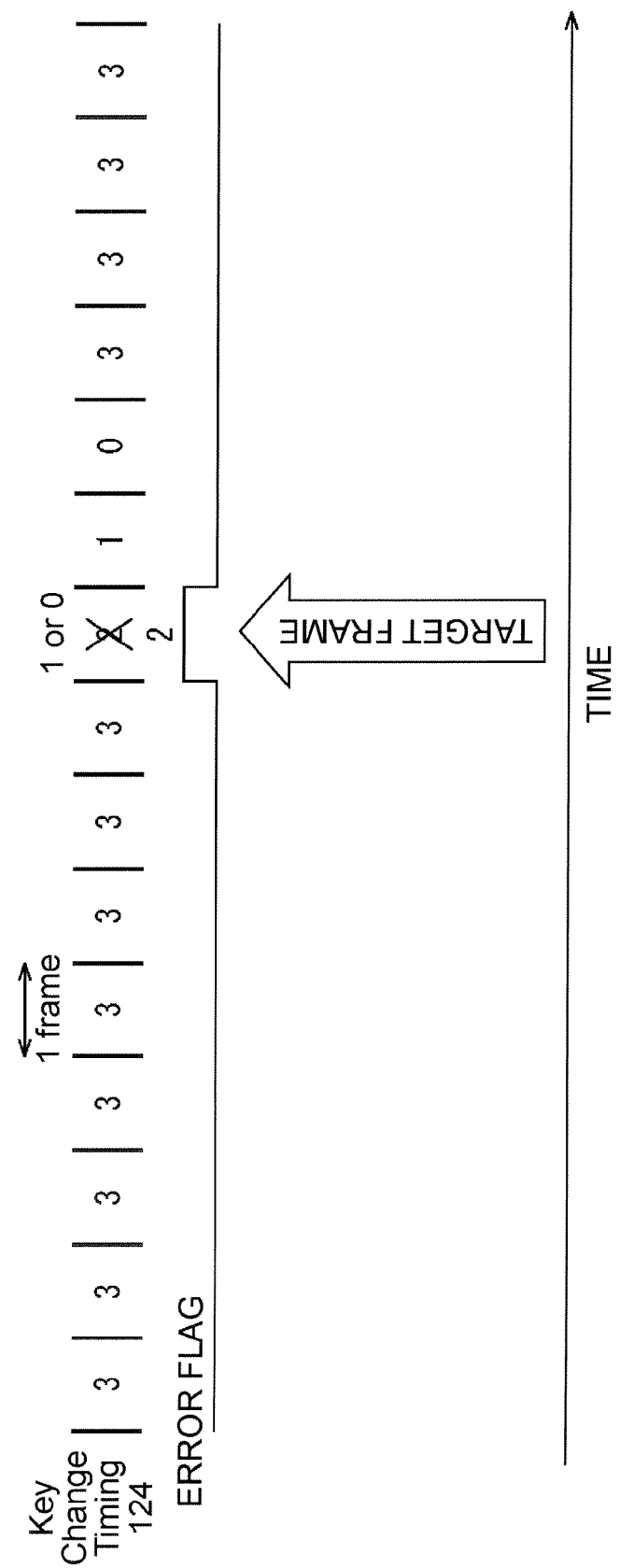
FIG. 16 illustrates an example of the processing result performed by the key change timing correction unit of the meta-data extracting unit shown in FIG. 5 according to the flow chart shown in FIGS. 8 and 9.

FIG. 16 illustrates an example in which the value of the Key Change Timing 124 for the immediately prior frame is 3(2'b11) and, although the value of the Key Change Timing 124 for the target frame should be 2(2'b10) for a normal case (see the pattern 1 in FIG. 7), the value is changed to 1(2'b01) or 0(2'b00) due to a transmission error.

In the example shown in FIG. 16, the processing proceeds to step S1 ("NO"), then to step S3 ("NO"), then to step S5 ("YES"), then to step S6 ("NO"), and then to step S8. Alternatively, the processing proceeds to step S1 ("NO"), then to step S3 ("NO"), then to step S5 ("NO"), then to step S7 ("NO"), and then to step S8. At step S8, the test result is determined to be "NO". Then, the process proceeds to step S11. After the process at step S11 is completed, the process proceeds to step S12. At step S12, the value of the Key Change Timing 124 for the target frame is interpolated into 2(2'b10). That is, in the example shown in FIG. 16, it is determined that the value of the Key Change Timing 124 for the immediately prior frame (i.e., 3(2'b11)) is reliable and the value of the Key Change Timing 124 for the target frame is interpolated into the value 2(2'b10) so that the pattern (3(2'b11), 2(2'b10)) in the pattern 1 of FIG. 7 is satisfied.

FIG. 17 illustrates an example in which the value of the Key Change Timing 124 for the immediately prior frame is 2(2'b10) and, although the value of the Key Change Timing 124 for the target frame should be 1(2'b01) for a normal case (see the pattern 2 in FIG. 7), the value is changed to one of 3(2'b11), 2(2'b10) and 0(2'b00) due to a transmission error.

In the example shown in FIG. 17, the processing proceeds to step S1 ("YES"), then to step S2 ("NO"), and then to step S8. Alternatively, the processing proceeds to step S1 ("NO"), then to step S3 ("YES"), then to step S4 ("NO"), and then to step S8. Alternatively, the processing proceeds to step S1 ("NO"), then to step S3 ("NO"), then to step S5 ("NO"), then to step S7 ("NO"), and then to step S8. At step S8, the test result is determined to be "NO". Then, the process proceeds to step S11. After the process at step S11 is completed, the process proceeds to step S12. At step S12, the value of the Key Change Timing 124 for the target frame is interpolated into 1(2'b01). That is, in the example shown in FIG. 17, it is determined that the value of the Key Change Timing 124 for the immediately prior frame (i.e., 2(2'b10)) is reliable and the value of the Key Change Timing 124 for the target frame is interpolated into the value 1(2'b01) so that the pattern 2 of FIG. 7 is satisfied.

FIG. 18 illustrates an example in which the value of the Key Change Timing 124 for the immediately prior frame is 1(2'b01) and, although the value of the Key Change Timing 124 for the target frame should be 0(2'b00) for a normal case (see the pattern 3 in FIG. 7), the value is changed to one of 3(2'b11), 2(2'b10), and 1(2'b01) due to a transmission error.

In the example shown in FIG. 18, the processing proceeds to step S1 ("YES"), then to step S2 ("NO"), and then to step S8. Alternatively, the processing proceeds to step S1 ("NO"), then to step S3 ("YES"), then to step S4 ("NO"), and then to step S8. Alternatively, the processing proceeds to step S1 ("NO"), then to step S3 ("NO"), then to step S5 ("YES"), then to step S6 ("NO"), and then to step S8. At step S8, the test result is determined to be "NO". Then, the process proceeds to step S11. After the process at step S11 is completed, the process proceeds to step S12. At step S12, the value of the Key Change Timing 124 for the target frame is interpolated into 0(2'b00). That is, in the example shown in FIG. 18, it is determined that the value of the Key Change Timing 124 for the immediately prior frame (i.e., 1(2'b01)) is reliable and the value of the Key Change Timing 124 for the target frame is interpolated into the value "0" so that the pattern 3 of FIG. 7 is satisfied.

According to the present embodiment, the value of the Key Change Timing 124 changed due to a transmission error is interpolated using the transition patterns (correlation) of the Key Change Timing 124 between the target frame and the immediately prior frame. However, an interpolation method is not limited to this method. For example, a transition pattern using a longer period (a transition pattern of the Key Change Timing 124 using more number of frames) can be applied.

However, even when such a long-time transition pattern is applied, the capability of interpolating for a transmission error is not necessarily increased.

In addition, when the long-time transition pattern is applied and a frame whose value of the Key Change Timing 124 is to be 0(2'b00) becomes the target frame, the value of the Key Change Timing 124 may be mistakenly corrected (i.e., may be corrected to a value other than "0"). If this problem occurs, the update timing of the LE Key 61-D for decryption is lost. Therefore, until the next update timing of the LE key 61-D arrives (1 minute at minimum), the content cannot be properly decrypted, which results in a serious accident.

Accordingly, it would be meaningless to apply a correlation (transition patterns) derived from more than two frames (i.e., the target frame and the immediately prior frame, as described in this embodiment) to interpolating the value of the Key Change Timing 124 changed due to a transmission error.

The above-described problem relating to the long-time transition pattern is described in more detail next with reference to FIG. 19.

FIG. 19 illustrates an example in which the value of the Key Change Timing 124 for the target frame is interpolated using transition patterns of the Key Change Timing 124 derived from three successive frames: the frame that is two frames prior to the target frame, the frame immediately prior to the frame, and the target frame.

More specifically, FIG. 19 illustrates the following example. For a first time, the value of the Key Change Timing 124 for the immediately preceding frame that is to be 2(2'b10) in a normal case is changed to 3(2'b11) due to a transmission error. Additionally, for the first time, the value of the Key Change Timing 124 for the target frame that is to be 1(2'b01) in a normal case is changed to 0(2'b00) due to a transmission error.

Hereinafter, a transition pattern of the Key Change Timing 124 for the three successive frames (i.e., the frame that is two frames prior to the target frame, the frame immediately prior to the target frame, and the target frame) is referred to as a "transition pattern for the target frame". Also, this transition pattern is expressed as (value of the Key Change Timing 124 for the frame that is two frames prior to the target frame, value of the Key Change Timing 124 for the immediately prior frame, value of the Key Change Timing 124 for the target frame).

In this case, the following steps Sa to Si are carried out.

At step Sa, the continuity is checked, that is, it is determined whether the transition pattern for the target frame (for a first time) is normal. In the example shown in FIG. 19, since the transition pattern for the target frame (for a first time) is (3, 3, 0), it is determined at step Sa that this pattern is erroneous.

At step Sb, it is determined whether the transition pattern for the frame that is two frames prior to the target frame (when the frame that is two frames prior to the target frame was the target frame) (for the first time) is erroneous. In the example shown in FIG. 19, since the error flag for the frame that is two frames prior to the target frame (for the first time) is not ON (i.e., "0"), it is determined at step Sb that an error has not occurred.

At step Sc, since an error is found in the continuity check and it is determined that the transition pattern for the frame that is two frames prior to the target frame is not erroneous, it is determined that the transition pattern is correctable (a process corresponding to the process at step S11 shown in FIG. 9). Thus, the value of the Key Change Timing 124 for the target frame is interpolated (a process corresponding to the process at step S12 shown in FIG. 9). In the example shown in FIG. 19, it is determined that the values of the Key Change Timing 124 for the frame that is two frames prior to the target frame and the frame immediately prior to the target frame are reliable (although, in practice, the value for the frame immediately prior to the target frame is abnormal due to an transmission error) and the value of the Key Change Timing 124 is interpolated into 2(2'b10).

At step Sd, the continuity is checked, that is, it is determined whether the transition pattern for the target frame (for a second time) is normal. In the example shown in FIG. 19, since the transition pattern for the target frame (for the second time) is (3, 2, 0), it is determined at step Sd that this pattern is erroneous.

At step Se, it is determined whether the transition pattern for the frame that is two frames prior to the target frame (when the frame that is two frames prior to the target frame was the target frame) (for the second time) is erroneous. In the example shown in FIG. 19, since the error flag for the frame that is two frames prior to the target frame (for the second time) is not ON (i.e., "0"), it is determined at step Se that an error has not occurred.

At step Sf, since an error is found in the continuity check and it is determined that the transition pattern for the frame that is two frames prior to the target frame is not erroneous, it is determined that the transition pattern is correctable (a process corresponding to the process at step S11 shown in FIG. 9). Thus, the value of the Key Change Timing 124 for the target frame is interpolated (a process corresponding to the process at step S12 shown in FIG. 9). In the example shown in FIG. 19, it is determined that the values of the Key Change Timing 124 for the frame that is two frames prior to the target frame and the frame immediately prior to the target frame are reliable (although, in practice, the value for the frame immediately prior to the target frame is a corrected value since the value for the frame that is two frames prior to the target frame is abnormal due to an transmission error). Thus, the value of the Key Change Timing 124 is interpolated into 1(2'b01).

At step Sg, the continuity is checked, that is, it is determined whether the transition pattern for the target frame (for a third time) is normal. In the example shown in FIG. 19, since the transition pattern for the target frame (for the third time) is (2, 1, 3), it is determined at step Sg that this pattern is erroneous.

At step Sh, it is determined whether the transition pattern for the frame that is two frames prior to the target frame (when the frame that is two frames prior to the target frame was the target frame) (for the third time) is erroneous. In the example shown in FIG. 19, since the error flag for the frame that is two frames prior to the target frame (for the third time) is ON (i.e., "1"), it is determined at step Sh that an error has occurred.

At step Si, since an error is found in the continuity check and it is determined that the transition pattern for the frame that is two frames prior to the target frame is erroneous, it is determined that the transition pattern is uncorrectable. Accordingly, the value of the Key Change Timing 124 for the target frame is not interpolated, and therefore, the present value continues to be used (a process corresponding to the process at step S10 shown in FIG. 9). In the example shown in FIG. 19, the value of the Key Change Timing 124 "3)2'b11)" continues to be used.

As described above, when a frame for which the value of the Key Change Timing 124 is to be 0(2'b00) becomes the target frame (in the second time in the example shown in FIG. 19), that value of the Key Change Timing 124 for the target frame is miscorrected (i.e., is interpolated to 1(2'b01) in the example shown in FIG. 19). That is, the above-described problem occurs. If this problem occurs, as described above, the update timing of the LE Key 61-D for decryption is lost (i.e., the value of the Key Change Timing 124 does not become 0(2'b00)). Therefore, until the next update timing of the LE key 61-D arrives (1 minute at minimum), the content cannot be properly decrypted, which results in a serious accident.

So far, an example of the processing of the key change timing correction unit 111 (see FIG. 5) has been described.

It is noted that there is a relationship shown in FIG. 20 between the value of the Key Change Timing 124 and the value of the Current Frame Count 134 (Count Link Encryption Frame Count 134). That is, FIG. 20 illustrates the relationship between the Key Change Timing 124 and the Current Frame Count 134.

As shown in FIG. 20, when a frame for which the value of the Key Change Timing 124 is 0(2'b00) becomes the target frame, the value of the Current Frame Count 134 is reset to "0". Subsequently, that value is incremented by one for each of the frames.

Additionally, if a transmission error occurs in the meta data 64-3 (see FIG. 4) of the meta-data overlapped and encrypted AV data, the value of the Current Frame Count 134 may become abnormal since the meta data 64-3 includes the Current Frame Count 134 as well as the Key Change Timing 124.

Accordingly, in the present embodiment, like the interpolation of the value of the Key Change Timing 124 performed by the key change timing correction unit 111 (see FIG. 5), the interpolation of the value of the Current Frame Count 134 is necessary.

Therefore, the present inventor has discovered the following method of interpolating the value of the Current Frame Count 134 in addition to the above-described method of interpolating the value of the Key Change Timing 124. That is, if it is determined that a transmission error has occurred when a frame for which the value of the Key Change Timing 124 is 0(2'b00) is the target value, the interpolation value of the Current Frame Count 134 for the target frame is determined from the value of the Key Change Timing 124. In contrast, if it is determined that a transmission error has occurred when a frame for which the value of the Key Change Timing 124 is not 0(2'b00) is the target value, the interpolation value of the Current Frame Count 134 for the target frame is determined from the value of the Current Frame Count 134 for the immediately prior frame.

According to the present embodiment, such a method is applied to the LEFRAME count value correcting unit 112 (see FIG. 5). Therefore, the LEFRAME count value correcting unit 112 carries out, for example, a process according to a flow chart shown in FIG. 21. That is, FIG. 21 illustrates an example of a process that realizes this method, namely, a flow chart of an exemplary operation of the LEFRAME count value correcting unit 112.

Figure 21:
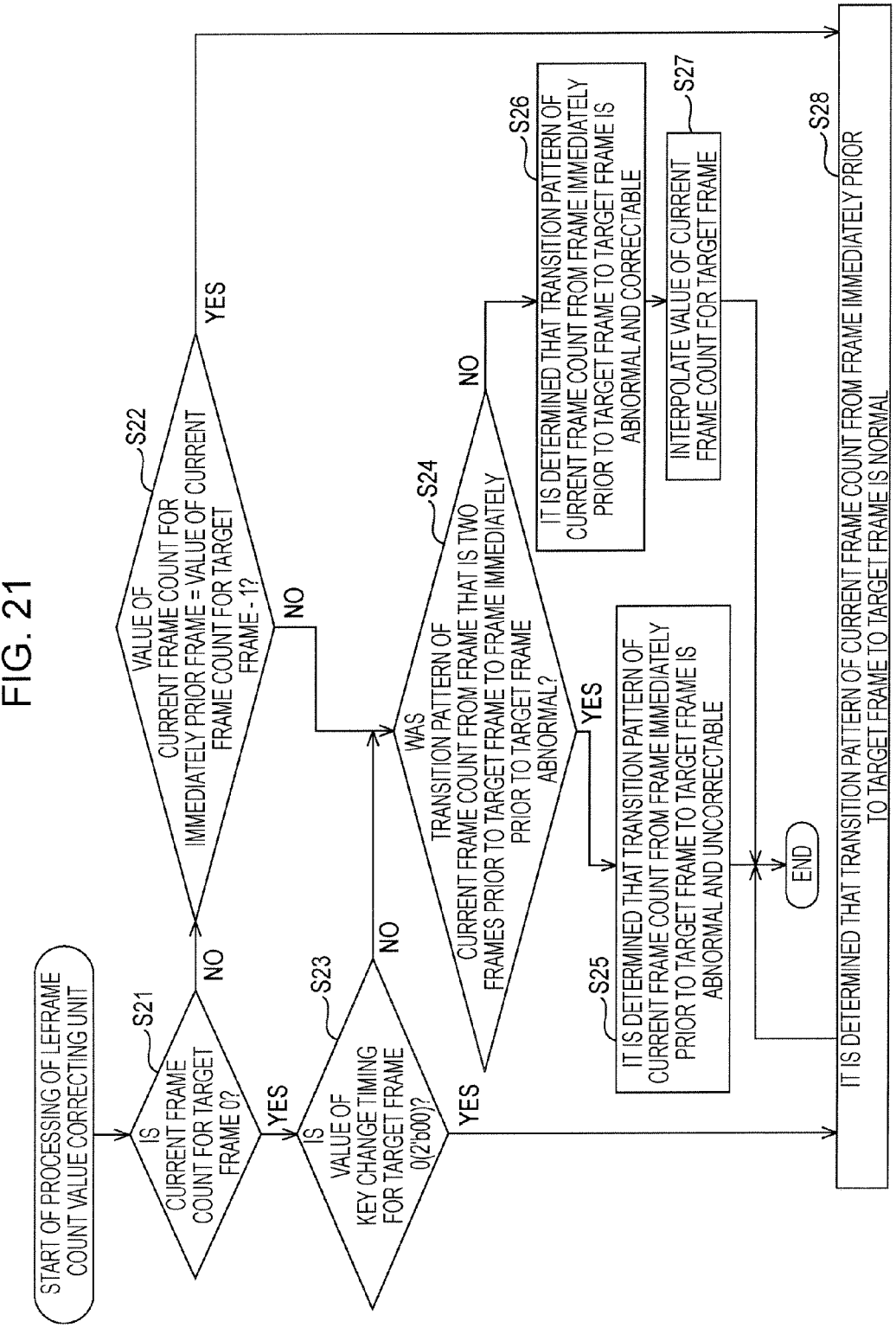
FIG. 21 illustrates an exemplary operation of an LEFRAME count value correcting unit of the meta-data extracting unit shown in FIG. 5.

However, the process shown in FIG. 21 is carried out for the target frame. That is, the process shown in FIG. 21 is carried out only once for each of the frames (data items) of the encrypted AV data. More specifically, when a first frame becomes the target frame, the process shown in FIG. 21 is carried out once. Subsequently, when a second frame subsequent to the first frame becomes the target frame, the process shown in FIG. 21 is carried out once.

At step S21, the LEFRAME count value correcting unit 112 determines whether the value of the Current Frame Count 134 for the target frame is "0" or not.

If, at step S21, it is determined that the value of the Current Frame Count 134 for the target frame is not "0", that is, it is determined that the value of the Current Frame Count 134 for the target frame is a value other than "0", the process proceeds to step S22. At step S22, the LEFRAME count value correcting unit 112 determines whether the value of the Current Frame Count 134 for the immediately prior frame=the value of the Current Frame Count 134 for the target frame−1. That is, the LEFRAME count value correcting unit 112 determines whether the value of the Current Frame Count 134 for the immediately prior frame is smaller than the value of the Current Frame Count 134 for the target frame by one.

If, at step S22, it is determined that the value of the Current Frame Count 134 for the immediately prior frame=the value of the Current Frame Count 134 for the target frame−1, that is, if it is determined that the value of the Current Frame Count 134 for the immediately prior frame is smaller than the value of the Current Frame Count 134 for the target frame by one, the process proceeds to step S28.

At step S28, the LEFRAME count value correcting unit 112 determines that the transition pattern of the Current Frame Count 134 from the immediately prior frame to the target frame is a normal pattern. Thus, the Current Frame Count 134 for the target frame is directly delivered to the AES input generating unit 110 as the corrected (zero-corrected) Current Frame Count 135. Thereafter, the processing of the LEFRAME count value correcting unit 112 for the target frame is completed.

In contrast, if, at step S22, it is determined that the value of the Current Frame Count 134 for the immediately prior frame≠the value of the Current Frame Count 134 for the target frame−1, that is, if it is determined that the value of the Current Frame Count 134 for the immediately prior frame is a value different from a value that is smaller than the value of the Current Frame Count 134 for the target frame by one, the process proceeds to step S24.

At step S24, the LEFRAME count value correcting unit 112 determines whether the transition pattern of the Current Frame Count 134 from the frame that is two frames prior to the target frame to the frame immediately prior to the target frame was abnormal. That is, the LEFRAME count value correcting unit 112 determines whether the transition pattern determined in the process of the LEFRAME count value correcting unit 112 when the immediately prior frame was the target frame, namely, the transition pattern determined by the previous process is abnormal.

If, at step S24, it is determined that the transition pattern of the Current Frame Count 134 from the frame that is two frames prior to the target frame to the frame immediately prior to the target frame is abnormal, the process proceeds to step S25. At step S25, the LEFRAME count value correcting unit 112 determines that, although the transition pattern of the Current Frame Count 134 from the immediately prior frame to the target frame is abnormal, the transition pattern is uncorrectable. Thus, the value of the Current Frame Count 134 for the target frame is directly delivered to the AES input generating unit 110 as the corrected (zero-corrected) Current Frame Count 135. Thereafter, the processing of the LEFRAME count value correcting unit 112 for the target frame is completed.

In contrast, if, at step S24, it is determined that the transition pattern of the Current Frame Count 134 from the frame that is two frames prior to the target frame to the frame immediately prior to the target frame was normal (i.e., not abnormal), the process proceeds to step S26. At step S26, the LEFRAME count value correcting unit 112 determines that the transition pattern of the Current Frame Count 134 from the immediately prior frame to the target frame is abnormal and is correctable. Thereafter, at step S27, the LEFRAME count value correcting unit 112 interpolates the value of the Current Frame Count 134 for the target frame. Basically, the interpolated value used at step S27 is determined according to the above-described method. The specific examples are described below with reference to FIGS. 22 and 23.

The processing result at step S27, namely, the interpolated value of the Current Frame Count 134 for the target frame is delivered to the AES input generating unit 110 as the corrected Current Frame Count 135. Thereafter the processing of the LEFRAME count value correcting unit 112 for the target frame is completed.

If, at step S21, it is determined that the value of the Current Frame Count 134 for the target frame is "0", the process proceeds to step S23. At step S23, the LEFRAME count value correcting unit 112 determines whether the value of the Key Change Timing 124 for the target frame is 0 (2'b00).

If, at step S23, it is determined that the value of the Key Change Timing 124 for the target frame is 0(2'b00), the process proceeds to step S28. Thereafter, as described above, the process at step S28 is executed so that the value of the Current Frame Count 134 for the target frame is directly delivered to the AES input generating unit 110 as the corrected (zero-corrected) Current Frame Count 135. Thereafter, the processing of the LEFRAME count value correcting unit 112 for the target frame is completed.

In contrast, if, at step S24, it is determined that the value of the Key Change Timing 124 for the target frame is not 0(2'b00) (i.e., one of 3(2'b11), 2(2'b10), and 1 (2'b01)), the process proceeds to step S24. Thereafter, the processes subsequent to step S24 are repeated.

That is, in this case, if the transition pattern of the Current Frame Count 134 from the frame that is two frames prior to the target frame to the frame immediately prior to the target frame is abnormal, the Current Frame Count 134 for the target frame is directly delivered to the AES input generating unit 110 as the corrected (zero-corrected) Current Frame Count 135. Thereafter, the processing of the LEFRAME count value correcting unit 112 for the target frame is completed. In contrast, if the transition pattern of the Current Frame Count 134 from the frame that is two frames prior to the target frame to the frame immediately prior to the target frame is normal, the value of the Current Frame Count 134 for the target frame is interpolated. The interpolated value is delivered to the AES input generating unit 110 as the corrected Current Frame Count 135. Thereafter, the processing of the LEFRAME count value correcting unit 112 for the target frame is completed.

The processing of the LEFRAME count value correcting unit 112 for the target frame is described in more detail next with reference to FIGS. 22 and 23.

Figure 22:
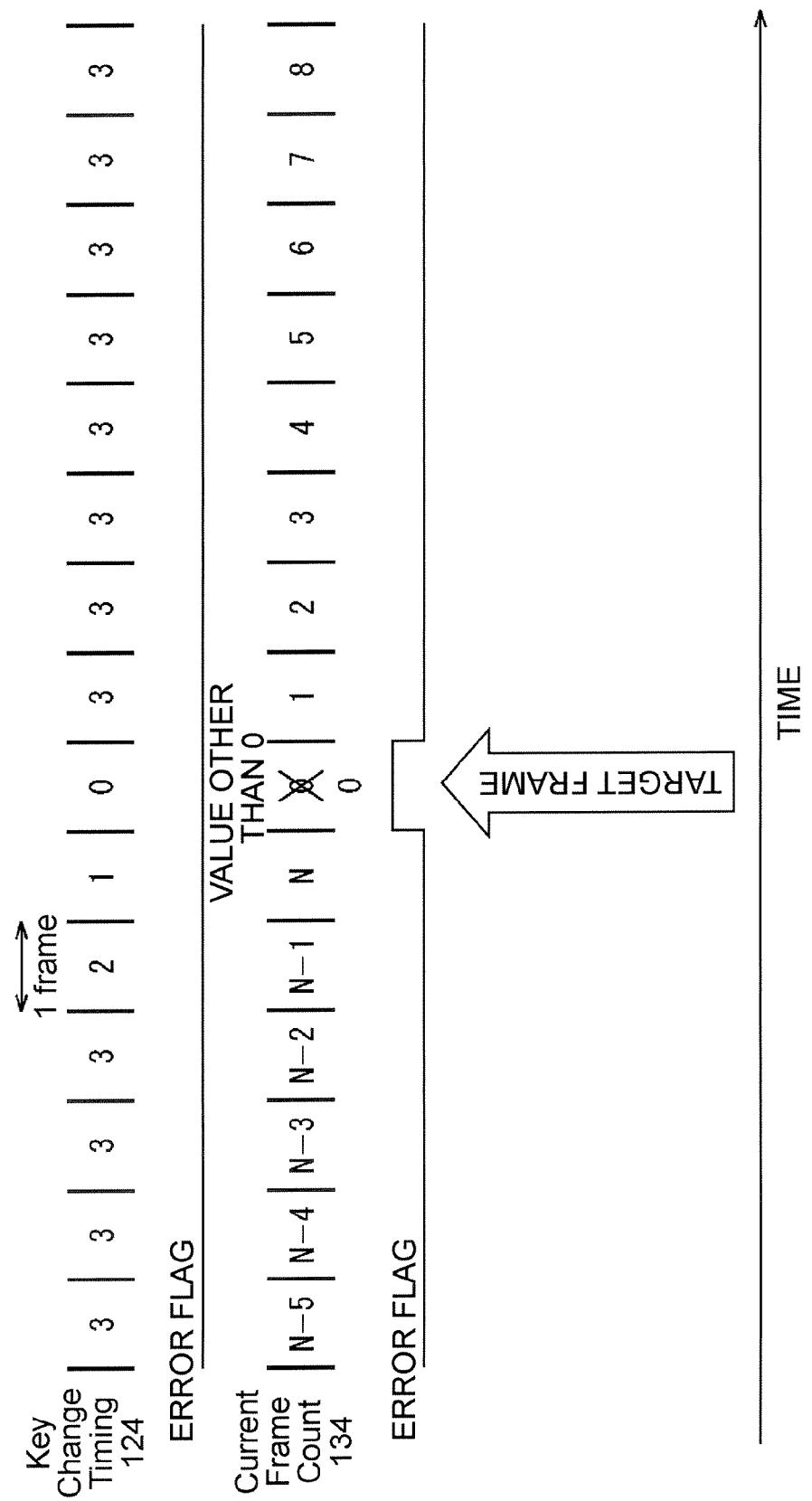
FIG. 22 illustrates an example of the processing result performed by the LEFRAME count value correcting unit of the meta-data extracting unit shown in FIG. 5 according to a flow chart shown in FIG. 21.
Figure 23:
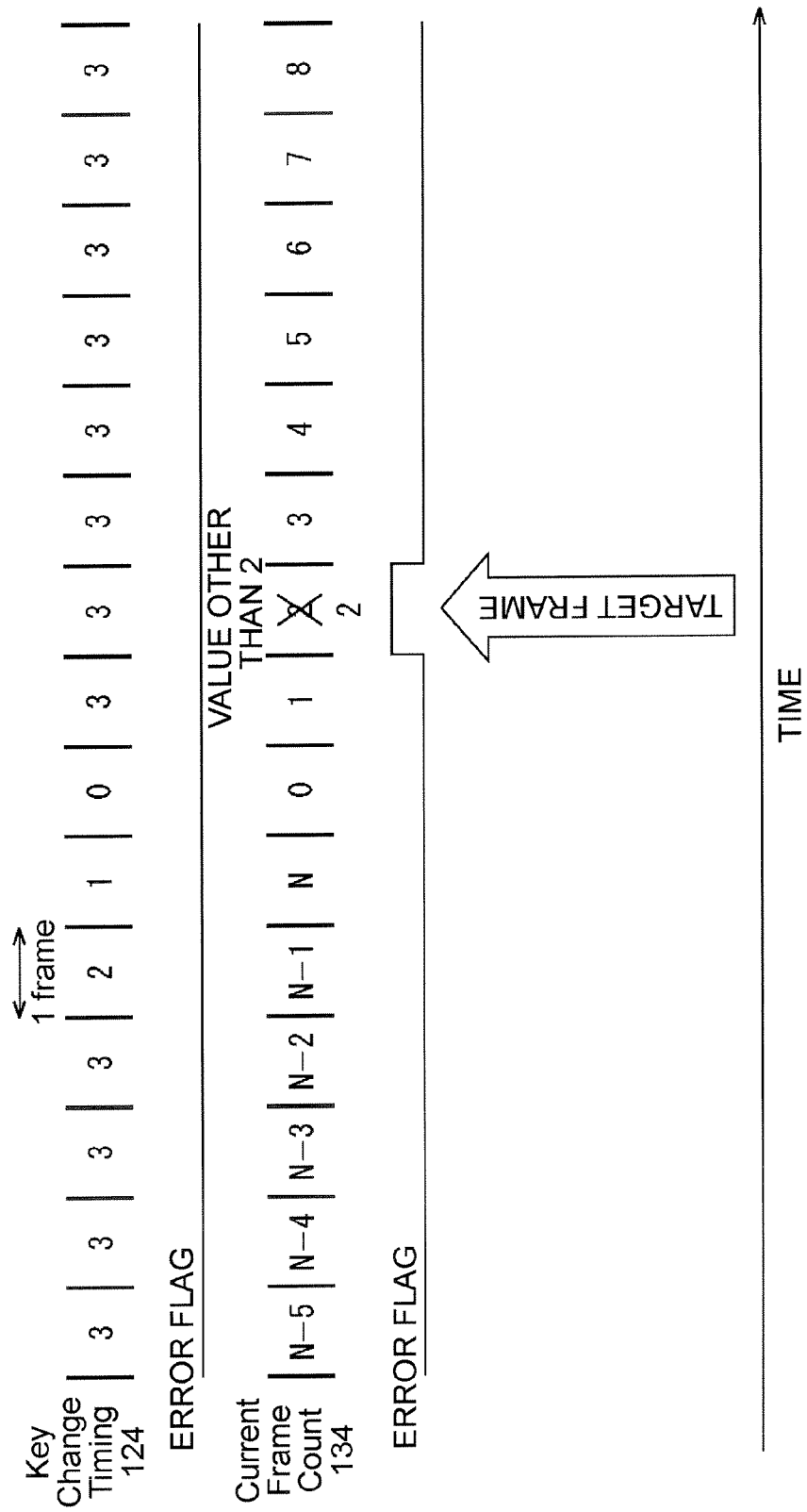
FIG. 23 illustrates an example of the processing result performed by the LEFRAME count value correcting unit of the meta-data extracting unit shown in FIG. 5 according to the flow chart shown in FIG. 21.

FIGS. 22 and 23 illustrate specific examples of the processing of the LEFRAME count value correcting unit 112 for the target frame.

In FIGS. 22 and 23, the uppermost diagram illustrates the temporal transition of the values of the Key Change Timing 124 and error flags for the frames.

In FIGS. 22 and 23, the middle diagram illustrates the temporal transition of the values of the Current Frame Count 134 and error flags for the frames.

In the temporal transition diagrams of the Current Frame Count 134 shown in FIGS. 22 and 23, the number with a strike-through symbol "X" thereon represents the value of the Key Change Timing 124 when the transition pattern of the Key Change Timing 124 from the immediately prior frame to the target frame is normal (a normal value). In addition, the number indicated above the strike-through symbol "X" is a value of the Current Frame Count 134 that is changed from the normal value due to a transmission error. The number indicated under the strike-through symbol "X" is the value interpolated at step S27 (see FIG. 21) by means of the LEFRAME count value correcting unit 112.

Additionally, in FIGS. 22 and 23, the error flags for the Current Frame Count 134 indicate whether the transition pattern from the immediately prior frame to the target frame is abnormal or not. If the transition pattern is abnormal, the error flag is "1". In contrast, If the transition pattern is normal, the error flag is "0". That is, the error flag that is ON ("1") indicates that the transition pattern of the Current Frame Count 134 from the immediately prior frame to the target frame is abnormal. Accordingly, if the error flag is ON ("1") for the immediately prior frame, it is determined at step S24 in FIG. 21 that the transition pattern of the Current Frame Count 134 from the frame that is two frames prior to the target frame to the immediately prior frame was abnormal (i.e., the test result is "YES"), the process proceeds to step S25.

FIG. 22 illustrates an example in which, although the value of the Current Frame Count 134 for the target frame is to be "0" in a normal case, that value has become a value other than "0" due to a transmission error.

In the example shown in FIG. 22, the process proceeds to step S21 ("NO"), and then to step S22 ("NO"), and then to step S24. At step S24, the test result is determined to be "NO". Then, the process proceeds to step S26. After the process at step S26 is completed, the process proceeds to step S27. At step S27, the value of the Current Frame Count 134 for the target frame is interpolated into "0".

That is, FIG. 22 illustrates an example in which the frame for which the value of the Key Change Timing 124 is 0(2'b00) is the target frame. In this case, according to the above-described method, the interpolated value of the Current Frame Count 134 for the target frame is determined from the value of the Key Change Timing 124. Accordingly, in the example shown in FIG. 22, since the value of the Key Change Timing 124 is 0(2'b00) (i.e., the update timing of the LE Key 61-D for decryption shown in FIG. 1), the value of the Current Frame Count 134 is interpolated into "0".

FIG. 23 illustrates an example in which, although the value of the Current Frame Count 134 for the target frame is to be "2" in a normal case, that value has become a value other than "2" due to a transmission error.

In the example shown in FIG. 23, the process proceeds to step S21 ("NO"), and then to step S22 ("NO"), and then to step S24. At step S24, the test result is determined to be "NO". Then, the process proceeds to step S26. After the process at step S26 is completed, the process proceeds to step S27. At step S27, the value of the Current Frame Count 134 for the target frame is interpolated into "2".

That is, FIG. 23 illustrates an example in which the frame for which the value of the Key Change Timing 124 is not 0(2'b00) is the target frame. In this case, according to the above-described method, the interpolated value of the Current Frame Count 134 for the target frame is determined from the value of the Current Frame Count 134 for the immediately prior frame. Accordingly, in the example shown in FIG. 23, since the value of the Current Frame Count 134 for the immediately prior frame is "1" and that value is incremented by one for each of the frames (see FIG. 20), the value of the Current Frame Count 134 is interpolated into "2".

According to the present embodiment, the value of the Current Frame Count 134 changed due to a transmission error is interpolated using the transition patterns (correlation) of the Current Frame Count 134 between the target frame and the immediately prior frame. However, an interpolation method is not limited to this method. For example, a transition pattern using a longer period (a transition pattern of the Current Frame Count 134 using more number of frames) can be applied.

However, as described above, the reference interpolation of the Key Change Timing 124 handles a transmission error only in a frame. In addition, the Key Change Timing 124 and the Current Frame Count 134 (Current Link Encryption Frame Count 134) are contained in the same meta data 64-3 (see FIG. 4). Therefore, there is little possibility that a transmission error of successive frames occurs only for the Current Frame Count 134. As a result, even when such a long-time transmission pattern is used, the advantage is small despite the processing load of the hardware. It is desirable that the transition pattern according to the present embodiment, that is, the transition pattern of the Current Frame Count 134 between the target frame and the immediately prior frame is used.

So far, the decrypting apparatus 2 having a configuration shown in FIG. 1 (the decrypting apparatus 2 including the meta data extracting unit 21 having a configuration shown in FIG. 5) has been described as an information processing apparatus according to an embodiment of the present invention.

However, the information processing apparatus according to an embodiment of the present invention is not limited to the above-described decrypting apparatus. Any embodiments of the decrypting apparatus are available.

That is, the information processing apparatus of this invention can be achieved by any embodiment that satisfies the following condition.

That is, an information processing apparatus decrypts, using meta data, encrypted data obtained by encrypting stream data including a plurality of successive units of data according to a encryption method in which, when the stream data is sequentially encrypted on a unit-by-unit basis, one of a plurality of keys used for encrypting each of the units of data is updated on the basis of a predetermined rule. The meta data includes the plurality of keys used for encrypting the stream data and update information for identifying update timings of the plurality of keys. The information processing apparatus includes a decrypting unit, a meta data acquiring unit, and a correcting unit. The decrypting unit acquires the encrypted data and decrypts each of the plurality of encrypted units of the encrypted data using the key used for encrypting the unit of data among the plurality of keys. The meta data acquiring unit acquires the meta data and generates a plurality of decryption keys corresponding to the plurality of keys contained in the meta data. The meta data acquiring unit delivers the corresponding one of the decryption keys to the decrypting unit. Additionally, the meta data acquiring unit determines whether an error occurs in the update information. If the meta data acquiring unit determines that an error has occurred, the correcting unit corrects at least part of the update information. If the information processing apparatus satisfies these conditions, this information processing apparatus is applicable to any embodiment of the present invention.

That is, if the decrypting unit, the meta data acquiring unit, and the correcting unit have the above-described functionality, these are applicable to any embodiment of the present invention.

According to an embodiment of the present invention, since the information processing apparatus has such specific functionality, the information processing apparatus can provide an advantage in that, even if an error occurs when the encrypting unit transmits meta data to the decrypting unit, the decrypting unit can normally decrypt encrypted data using the meta data.

The above-described series of processes can be executed not only by hardware but also by software. When the above-described series of processes are executed by software, the programs of the software are installed from a program recording medium into a computer incorporated in dedicated hardware or a computer that can execute a variety of function by installing a variety of programs therein (e.g., a general-purpose personal computer).

Figure 24:
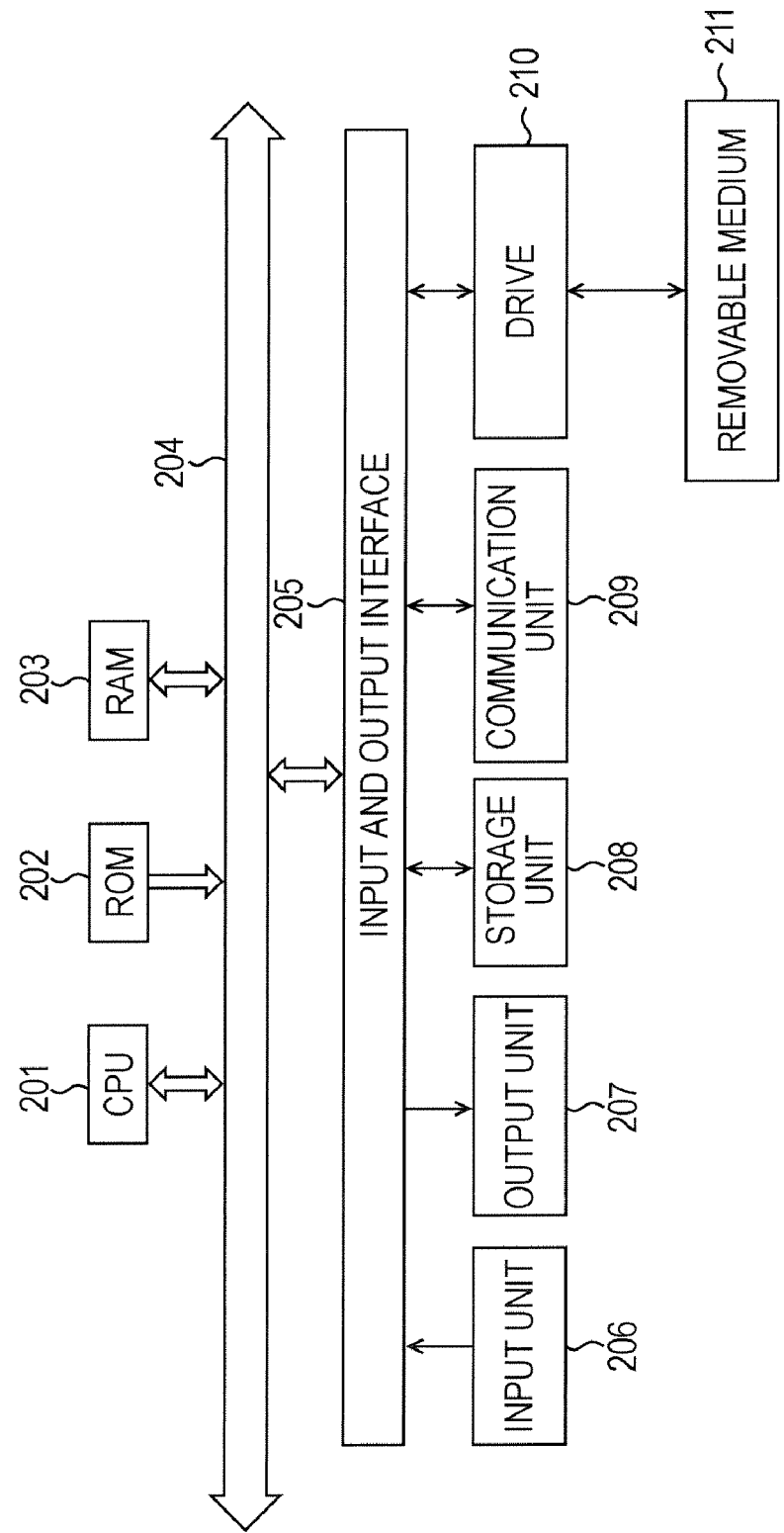
FIG. 24 is a block diagram of an exemplary structure of a personal computer that executes a program according to an embodiment of the present invention.

FIG. 24 is a block diagram of an exemplary structure of a personal computer that executes a program realizing the above-described series of operations. That is, for example, when the above-described series of operations are executed using the program, the meta data extracting unit 21 and the like can be realized using a personal computer or part of the personal computer having the structure shown in FIG. 24.

In FIG. 24, a central processing unit (CPU) 201 carries out a variety of processes according to a program stored in a read only memory (ROM) 202 or a storage unit 208. A random access memory (RAM) 203 stores a program executed by the CPU 201 and data as needed. The CPU 201, the ROM 202, and the RAM 203 are connected to each other via a bus 204.

Additionally, an input and output interface 205 is connected to the CPU 201 via the bus 204. An input unit 206 including a keyboard, a mouse, and a microphone and an output unit 207 including a display and a speaker are connected to the input and output interface 205. The CPU 201 executes a variety of processes in response to a command input from the input unit 206. Subsequently, the CPU 201 outputs the processing result to the output unit 207.

The storage unit 208 connected to the input and output interface 205 includes, for example, a hard disk, and stores a program that is executed by the CPU 201 and a variety of data. A communication unit 209 communicates with external apparatuses via a network (such as the Internet and a local area network).

Additionally, the program may be acquired via the communication unit 209 and may be stored in the storage unit 208.

A drive 210 connected to the input and output interface 205 drives a removable medium 211, such as a magnetic disk, an optical disk, a magnetooptical disk, or a semiconductor memory, when the removable medium 211 is mounted. Thus, the drive 210 acquires a program and data stored in the removable medium 211. The acquired program and data are transferred to the storage unit 208 as needed so that the transferred program and data are stored in the storage unit 208.

As shown in FIG. 24, examples of the program recording medium that stores a computer-executable program after the program is installed in the computer include the removable medium 211, the ROM 202 that temporarily or permanently stores the program, and a hard disk serving as the storage unit 208. The removable medium 211 is a package medium including a magnetic disk (including a flexible disk), an optical disk (including a compact disk-read only memory (CD-ROM) and a digital versatile disc (DVD)), a magnetooptical disk, and a semiconductor memory. The program is stored in the program recording medium via the communication unit 209 serving as an interface with a router or a modem using a wired or wireless communications medium, such as a local area network, the Internet, or a satellite broadcast network.

As used herein, the steps that describe the program stored in the program recording media include not only processes executed in the above-described sequence, but also processes that may be executed in parallel or independently.

As used herein, the term "system" refers to a combination of a plurality of apparatuses.

Furthermore, the embodiment of the present invention is applicable to not only the above-described system shown in FIG. 1 but also a variety of systems. For example, in the example shown in FIG. 1, the meta data 64 and the encrypted AV data obtained by encrypting AV data by means of the AV-data encrypting unit 32 are together transmitted from the encrypting apparatus 1 to the decrypting apparatus 2 as the meta-data overlapped and encrypted AV data. However, the meta data 64 and the encrypted AV data are not necessarily transmitted together. That is, the embodiment of the present invention is applicable to a system that transmits the meta data via a transmission channel different from that for the encrypted AV data.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus configured to decrypt, using meta data, encrypted data obtained by encrypting stream data including a plurality of successive units of data according to a first encryption method in which, when the stream data is sequentially encrypted on a unit-by-unit basis, each of a plurality of keys used for encrypting a corresponding one of the units of data is updated on the basis of a predetermined rule, the meta data including the plurality of keys used for encrypting the stream data and update information for identifying update timings of the plurality of keys, the apparatus comprising:

a decrypter configured to acquire the encrypted data and decrypt each of the units of data in the encrypted data using the key used for encrypting the unit of data among the plurality of keys; and a meta data acquirer configured to acquire the meta data and deliver one of the plurality of keys contained in the meta data that corresponds to the unit of data to the decrypter in accordance with the update information contained in the meta data, the meta data acquirer including, a first corrector configured to determine whether an error has occurred in the acquired update information identifying the update timings of the plurality of keys, and when it is determined that an error has occurred in the acquired update information, to correct at least part of the update information that has been acquired by issuing a command to change the update timing of at least one of the plurality of keys, the command being issued when a result of a comparison of a first update information value related to a target unit of data, which is to be decrypted by the at least one of the plurality of keys for which the command is issued, to a second update information value related to a preceding unit of data is in accordance with a predetermined transition pattern.

2. The information processing apparatus according to claim 1, wherein the update information includes units of update information, each corresponding to one of the plurality of units of data in the stream data and wherein the first corrector determines whether an error has occurred in the unit of update information corresponding to the unit of data that is a target of a decrypting process performed by the decrypter, and wherein, if the first corrector determines that the error has occurred, the first corrector corrects the unit of update information.

3. The information processing apparatus according to claim 2, wherein each of the units of update information includes an update value indicating to which unit of data prior to the unit of data the update timing of the next key for the unit of data corresponds, and wherein the first corrector determines whether an error has occurred in a first update value relating to the target unit of data among the update values on the basis of a transition pattern from a second update value relating to the unit of data immediately prior to the target unit of data to the first update value.

4. The information processing apparatus according to claim 3, wherein the meta data includes Meta packets 1, 2, and 3 that are generated for each of the plurality of units of data and that comply with Society of Motion Picture and Television Engineers (SMPTE) 291M, and wherein the plurality of keys are encrypted using a second encryption method that is different from the first encryption method and a predetermined one of a plurality of the encrypted keys is included in the Meta packets 1 and 2 associated with a predetermined unit of data, and wherein each of the update values is contained in Key Changing Timing of the Meta packet 3 for the corresponding unit of data.

5. The information processing apparatus according to claim 4, wherein the first update value representing a value of Key Changing Timing of the Meta packet 3 for the target unit of data is one of a 0th value that indicates that the target unit of data is the update timing of the next key, a 1st value that indicates that a unit of data subsequent to the target unit of data is the update timing of the next key, and a 2nd value that indicates that a unit of data that is two units subsequent to the target unit of data is the update timing of the next key, and a 3rd value that indicates that a unit of data that is three units or more units subsequent to the target unit of data is the update timing of the next key, and wherein, among transition patterns from the second update value to the first update value, a first transition pattern from the 3rd value to one of the 3rd value and the 2nd value, a second transition pattern from the 2nd value to the 1st value, a third transition pattern from the 1st value to the 0th value, and a fourth transition pattern from the 0th value to the 3rd value are defined to be normal transition patterns, and transition patterns other than the first, second, third, and fourth transition patterns are defined to be abnormal transition patterns, and wherein the first corrector determines whether the transition pattern from the second update value to the first update value is the normal transition pattern or the abnormal transition pattern and, if the first corrector determines that the transition pattern from the second update value to the first update value is the abnormal transition pattern, the first corrector determines that an error has occurred in the first update value so as to correct the first update value.

6. The information processing apparatus according to claim 5, wherein, if the first corrector determines that the transition pattern from the second update value to the first update value is the abnormal transition pattern, the first corrector corrects the first update value so that the transition pattern from the second update value to the first update value is changed to one of the normal transition patterns.

7. The information processing apparatus according to claim 5, wherein the first corrector further determines whether a transition pattern from a third update value for the unit of data that is two units prior to the target unit of data to the second update value is the normal transition pattern or the abnormal transition pattern and wherein, if the first corrector determines that the transition pattern from the third update value to the second update value is the abnormal transition pattern and the transition pattern from the second update value to the first update value is the abnormal transition pattern, the first corrector disables correction of the first update value.

8. The information processing apparatus according to claim 5, further comprising:
a second corrector configured to determine whether a transition pattern from a first count value in Current Frame Count of the Meta packet 3 for the unit of data that is immediately prior to the target unit of data to a second count value in the Current Frame Count of the Meta packet 3 for the target unit of data is abnormal, the second corrector correcting the second count value if the second corrector determines that the transition pattern is abnormal.

9. The information processing apparatus according to claim 8, wherein, if the second corrector determines that the transition pattern from the first count value to the second count value is abnormal and the first update value for the target unit of data is the 0th value, the second corrector corrects the second count value on the basis of the first update value that is the 0th value, and wherein, if the second corrector determines that the transition pattern from the first count value to the second count value is abnormal and the first update value for the target unit of data is a value other than the 0th value, the second corrector corrects the second count value on the basis of the first count value.

10. An information processing method for use in an information processing apparatus configured to decrypt, using meta data, encrypted data obtained by encrypting stream data including a plurality of successive units of data according to a encryption method in which, when the stream data is sequentially encrypted on a unit-by-unit basis, each of a plurality of keys used for encrypting a corresponding one of the units of data is updated on the basis of a predetermined rule, the meta data including the plurality of keys used for encrypting the stream data and update information for identifying update timings of the plurality of keys, the apparatus including at least a decrypter configured to acquire the encrypted data and decrypt each of the units of data in the encrypted data using the key used for encrypting the unit of data, the method comprising:
acquiring the meta data;
determining whether an error has occurred in the update information contained in the meta data;
correcting at least part of the update information when determining that an error has occurred by issuing a correction command to change the update timing of at least one of the plurality of keys; and
delivering one of the plurality of keys contained in the meta data that corresponds to the unit of data to the decrypter in accordance with the update information contained in the meta data when determining that an error has not occurred or in accordance with the correction command to correct the update information that has been acquired when determining that an error has occurred, wherein the issuing the correction command includes issuing the correction command when a result of a comparison of a first update information value related to a target unit of data, which is to be decrypted by the at least one of the plurality of keys for which the command is issued, to a second update information value related to a preceding unit of data is in accordance with a predetermined transition pattern.

11. A computer-readable storage medium having embedded therein instructions, which when executed by a computer, cause the computer to decrypt, using meta data, encrypted data obtained by encrypting stream data including a plurality of successive units of data according to a encryption method in which, when the stream data is sequentially encrypted on a unit-by-unit basis, each of a plurality of keys used for encrypting a corresponding one of the units of data is updated on the basis of a predetermined rule, the meta data including the plurality of keys used for encrypting the stream data and update information for identifying update timings of the plurality of keys, the program causing the computer to acquire the encrypted data and decrypt each of the units of data in the encrypted data using the key used for encrypting the unit of data, the program comprising:

acquiring the meta data;

determining whether an error has occurred in the update information contained in the meta data;

correcting at least part of the update information when determining that an error has occurred by issuing a correction command to change the update timing of at least one of the plurality of keys; and delivering one of the plurality of keys contained in the meta data that corresponds to the unit of data to the decrypter in accordance with the update information contained in the meta data when determining that an error has not occurred or in accordance with the correction command to correct the update information that has been acquired when determining that an error has occurred, wherein the issuing the correction command includes issuing the correction command when a result of a comparison of a first update information value related to a target unit of data, which is to be decrypted by the at least one of the plurality of keys for which the command is issued, to a second update information value related to a preceding unit of data is in accordance with a predetermined transition pattern.

* * * * *